US011035274B2

(12) United States Patent
Johansson et al.

(10) Patent No.: US 11,035,274 B2
(45) Date of Patent: Jun. 15, 2021

(54) METHOD AND SYSTEM FOR CONTROLLING AN AMMONIA COVERAGE DEGREE PROFILE

(71) Applicant: Scania CV AB, Södertälje (SE)

(72) Inventors: Björn Johansson, Älvsjö (SE); Anders Larsson, Tullinge (SE); Björn Westerberg, Södertälje (SE)

(73) Assignee: SCANIA CV AB

(*) Notice: Subject to any disclaimer, the term of this patent is extended or adjusted under 35 U.S.C. 154(b) by 0 days.

(21) Appl. No.: 16/465,180

(22) PCT Filed: Dec. 7, 2017

(86) PCT No.: PCT/SE2017/051229
§ 371 (c)(1),
(2) Date: May 30, 2019

(87) PCT Pub. No.: WO2018/106174
PCT Pub. Date: Jun. 14, 2018

(65) Prior Publication Data
US 2019/0345861 A1    Nov. 14, 2019

(30) Foreign Application Priority Data
Dec. 8, 2016    (SE) ................................. 1651616-3

(51) Int. Cl.
*F01N 3/20*    (2006.01)
*F01N 9/00*    (2006.01)

(52) U.S. Cl.
CPC ............. *F01N 3/206* (2013.01); *F01N 3/208* (2013.01); *F01N 3/2066* (2013.01); *F01N 9/00* (2013.01);
(Continued)

(58) Field of Classification Search
CPC ..... F01N 2900/0406; F01N 2900/1616; F01N 2900/1622; F01N 2560/026; F01N 3/18–227
See application file for complete search history.

(56) References Cited

U.S. PATENT DOCUMENTS

| 8,800,274 B2 | 8/2014 | Sun et al. ........................ 60/301 |
| 2008/0202097 A1 | 8/2008 | Driscoll et al. ................. 60/274 |

(Continued)

FOREIGN PATENT DOCUMENTS

| EP | 2 025 388 A1 | 2/2009 |
| GB | 2501930 A | 11/2013 |

(Continued)

OTHER PUBLICATIONS

Novelty Search Report dated Oct. 24, 2014.
(Continued)

*Primary Examiner* — Laert Dounis
(74) *Attorney, Agent, or Firm* — Ostrolenk Faber LLP

(57) ABSTRACT

A method (and a system that executes the method) for control of at least one sectional ammonia coverage degree profile $NH_{3\_profile}$ for at least one SCR catalyst included in an exhaust gas treatment system, the method includes determining at least one ammonia sectional coverage degree profile $NH_{3\_profile\_det}$ for the at least one SCR catalyst based on a flow F, a temperature T and a composition C of the exhaust stream upstream of the at least one SCR catalyst. The method also includes comparing the at least one sectional ammonia coverage $NH_{3\_profile\_ref}$ with at least one sectional reference profile for an ammonia coverage degree $NH_{3\_profile\_ref}$ for the at least one SCR catalyst. The method further includes controlling, based on the comparison, at least one of a concentration of nitrogen oxides $C_{NOX}$ in the exhaust stream to be output from the combustion engine and a dosage of a reductant including ammonia NH3 to be
(Continued)

injected into the exhaust stream upstream of the at least one SCR catalyst.

12 Claims, 5 Drawing Sheets

(52) U.S. Cl.
CPC .... *F01N 2560/02* (2013.01); *F01N 2560/026* (2013.01); *F01N 2560/06* (2013.01); *F01N 2570/14* (2013.01); *F01N 2570/18* (2013.01); *F01N 2610/02* (2013.01); *F01N 2900/0406* (2013.01); *F01N 2900/1602* (2013.01); *F01N 2900/1616* (2013.01); *F01N 2900/1621* (2013.01); *F01N 2900/1622* (2013.01); *Y02A 50/20* (2018.01); *Y02T 10/12* (2013.01); *Y02T 10/40* (2013.01)

(56) References Cited

U.S. PATENT DOCUMENTS

| | | | |
|---|---|---|---|
| 2009/0056315 A1* | 3/2009 | Solbrig | F01N 3/208 60/286 |
| 2010/0024389 A1* | 2/2010 | Gady | B01D 53/9409 60/274 |
| 2010/0050614 A1 | 3/2010 | Parmentier et al. | |
| 2010/0058740 A1 | 3/2010 | Kurtz | 60/286 |
| 2010/0326052 A1* | 12/2010 | Sun | B01D 53/90 60/274 |
| 2011/0265457 A1* | 11/2011 | Sato | F01N 3/2066 60/285 |
| 2011/0308233 A1 | 12/2011 | Darr et al. | 60/276 |
| 2013/0064717 A1 | 3/2013 | Masaki et al. | 422/108 |
| 2013/0101485 A1* | 4/2013 | Yacoub | F01N 9/005 423/212 |
| 2013/0247543 A1* | 9/2013 | Hirota | F01N 3/08 60/274 |
| 2014/0032189 A1* | 1/2014 | Hehle | F01N 9/005 703/2 |
| 2014/0150409 A1* | 6/2014 | George | F01N 3/208 60/274 |
| 2019/0024563 A1* | 1/2019 | Wang | B01D 53/9418 |

FOREIGN PATENT DOCUMENTS

| | | |
|---|---|---|
| JP | 2014-070566 | 4/2014 |
| SE | 526 404 C2 | 9/2005 |
| SE | 533 790 C2 | 1/2011 |
| SE | 537 927 C2 | 11/2015 |
| WO | WO 2005/068797 A1 | 7/2005 |
| WO | WO 2010/138071 A1 | 12/2010 |
| WO | WO 2011/138277 A1 | 11/2011 |
| WO | WO 2012/038807 A1 | 3/2012 |
| WO | WO 2013/165309 A1 | 11/2013 |

OTHER PUBLICATIONS

Search Report dated Aug. 31, 2017 in corresponding Swedish Patent Application No. 1651616-3.
International Search Report dated Feb. 15, 2018 in corresponding PCT International Application No. PCT/SE2017/051229.
Written Opinion dated Feb. 15, 2018 in corresponding PCT International Application No. PCT/SE2017/051229.
Extended European Search Report and European Search Opinion dated Apr. 15, 2020 in corresponding European Patent Application No. EP 17 87 8469 (total 7 pages).
European Patent Office Communication pursuant to Article 94(3) EPC dated Jan. 12, 2021 in corresponding European Patent Application No. EP 17 878 469.0 (total 6 pages).

* cited by examiner

METHOD AND SYSTEM FOR CONTROLLING AN AMMONIA COVERAGE DEGREE PROFILE

CROSS-REFERENCE TO RELATED APPLICATIONS

The present application is a 35 U.S.C. §§ 371 national phase conversion of PCT/SE2017/051229, filed Dec. 7, 2017, which claims priority of Swedish Patent Application No. 1651616-3, filed Dec. 8, 2016, the contents of all of which are incorporated herein by reference. The PCT International Application was published in the English language.

FIELD OF THE INVENTION

The present invention relates to a method for controlling at least one ammonia coverage degree profile for at least one selective catalytic reduction catalyst. The present invention also relates to a system arranged for controlling at least one ammonia coverage degree profile for at least one selective catalytic reduction catalyst. The present invention also relates to a vehicle including the system, and a computer program and a computer program product implementing the method according to the invention.

BACKGROUND OF THE INVENTION

The following background description is a description of the background to the present invention, and thus need not necessarily be a description of prior art.

In connection with increased government interests concerning pollution and air quality, primarily in urban areas, emission standards and regulations regarding emissions from combustion engines have been drafted in many jurisdictions.

Such emission standards often include requirements, defining acceptable limits of exhaust emissions from combustion engines in for example vehicles. For example, emission levels of nitrogen oxides $NO_x$, hydrocarbons $C_xH_y$, carbon monoxide CO and particles PM are often regulated by such standards for most types of vehicles. Vehicles equipped with combustion engines typically give rise to such emissions in varying degrees. In this document, the invention will be described mainly for its application in vehicles. However, the invention may be used in substantially all applications where combustion engines are used, for example in vessels such as ships or aeroplanes/helicopters, wherein regulations and standards for such applications limit the emissions from the combustion engines.

In an effort to comply with these emission standards, the exhaust gases caused by the combustion of the combustion engine are treated/purified.

A common way of treating exhausts from a combustion engine comprises a so-called catalytic purification process, which is why vehicles equipped with a combustion engine usually comprise at least one catalyst. There are different types of catalysts, where the different respective types may be suitable depending on for example the combustion concept, combustion strategies and/or fuel types being used in the vehicles, and/or the types of compounds in the exhaust stream to be purified. In relation to at least nitrous gases (nitrogen monoxide, nitrogen dioxide), referred to below as nitrogen oxides $NO_x$, vehicles often comprise a catalyst, wherein an additive is supplied to the exhaust stream resulting from the combustion in the combustion engine, in order to reduce nitrogen oxides $NO_x$, primarily to nitrogen gas and aqueous vapour.

SCR (Selective Catalytic Reduction) catalysts are a commonly used type of catalysts for this type of reduction, primarily for heavy duty vehicles. SCR catalysts usually use ammonia $NH_3$, or a composition from which ammonia may be generated/formed, as an additive to reduce the amount of nitrogen oxides $NO_x$ in the exhausts. The additive is injected into the exhaust stream resulting from the combustion engine upstream of the catalyst. The additive added to the catalyst is adsorbed (stored) in the catalyst, in the form of ammonia $NH_3$, so that a redox-reaction may occur between nitrogen oxides $NO_x$ in the exhausts and ammonia $NH_3$ available via the additive.

A modern combustion engine is a system where there is cooperation and mutual impact between the engine and the exhaust treatment. Specifically, there is a correlation between the exhaust treatment system's ability to reduce nitrogen oxides $NO_x$ and the fuel efficiency of the combustion engine. For the combustion engine, there is a correlation between the engine's fuel efficiency/total efficiency and the nitrogen oxides $NO_x$ produced by it. This correlation specifies that for a given system there is a positive correlation between nitrogen oxides $NO_x$ produced and fuel efficiency. This means that an engine which is permitted to emit more nitrogen oxides $NO_x$ may be induced to consume less fuel, which may yield a higher combustion efficiency. Similarly, there is often a negative correlation between a produced particle mass PM and the fuel efficiency, meaning that an increased emission of particle mass PM from the engine is connected with an increased fuel consumption.

This correlation is the background to the widespread use of exhaust treatment systems comprising an SCR-catalyst, where the intention is the optimisation of the engine's fuel consumption and emission of particles, towards a relatively larger amount of nitrogen oxides $NO_x$ being produced. A reduction of these nitrogen oxides $NO_x$ is then carried out in the exhaust treatment system, which thus may also comprise an SCR catalyst. Through an integrated approach in the design of the engine and exhaust treatment system, where the engine and exhaust treatment complement each other, a high fuel efficiency may therefore be achieved jointly with low emissions of both particles PM as well as nitrogen oxides $NO_x$.

SUMMARY OF THE INVENTION

Thus, when the SCR catalyst is warm enough, the ammonia additive is injected into the SCR catalyst together with the exhaust gases, whereby the ammonia reacts with the nitrogen oxides $NO_x$ in the exhaust gases and reduces the nitrogen oxides $NO_x$. There is a balance/equilibrium between an amount of ammonia in the exhaust gases and the amount of ammonia coverage degree in the SCR catalyst. The balance changes with the amount of nitrogen oxides $NO_x$ in the exhaust gases and with the temperature of the SCR catalyst.

At a start of the engine, when there initially is essentially no ammonia stored in the SCR catalyst, the SCR catalyst will initially adsorb plenty of ammonia, i.e. the SCR catalyst is filled up with ammonia during this initial phase.

During stationary operating states, the ammonia coverage degree for the SCR catalyst depends on the temperature of the SCR catalyst. At lower temperatures, there is generally more ammonia stored in the SCR catalyst than at higher temperatures. At higher temperatures, the SCR catalyst thus has a much lower ammonia coverage degree than for lower temperatures.

In order to provide an efficient reduction of nitrogen oxides $NO_x$ in the SCR catalyst, the ammonia coverage degree for the SCR catalyst may be adjusted by dynamically controlling the injection of the ammonia into the exhaust gases upstream of the SCR catalyst.

However, for some operational states for the SCR catalyst, such as e.g. for temperature transient operational states, the control of the ammonia injection might not be able to adjust for the fast changing temperatures, and is thus also not able to adjust for the temperature dependent storage of ammonia in the SCR catalyst. An abundance of ammonia may therefore occur at the SCR catalyst, and the SCR catalyst may not cope with using and/or storing this abundance of ammonia.

Generally, one of the main difficulties with controlling the ammonia/urea dosing upstream an SCR catalyst is to handle the dynamics of ammonia $NH_3$ accumulation in the SCR catalyst.

The ammonia/urea dosing control problem comprises several parts. The main objective of the dosing is to achieve a required nitrogen oxides $NO_x$ conversion. This conversion could directly be converted into a corresponding ammonia/urea flow. However, depending on operating conditions, a certain surplus is also needed, since the limited residence time in the catalyst does not allow all ammonia $NH_3$ formed from the dosed urea to be consumed by the nitrogen oxides $NO_x$ reduction reactions. The surplus increases the ammonia $NH_3$ concentration, and thus also the reaction rate, making it possible to reach the required nitrogen oxides $NO_x$ conversion. The urea flow corresponding to the required nitrogen oxides $NO_x$ conversion together with the surplus constitutes a static dosing.

One of the fundamental properties of the SCR catalyst is that it accumulates ammonia $NH_3$. Ammonia $NH_3$ accumulation is an equilibrium property, meaning that accumulated ammonia $NH_3$ always strives to be in equilibrium with ammonia $NH_3$ in gas phase. The ability to accumulate ammonia $NH_3$ is highly temperature dependent, large at low temperatures and decreasing with higher temperatures. The equilibrium is also influenced by ammonia $NH_3$ consumption from the nitrogen oxides $NO_x$ reduction reactions. Furthermore, the extent of the nitrogen oxides $NO_x$ reduction is influenced by the residence time, and thus by the exhaust gas flow.

When a SCR catalyst is cold, i.e. has a lower temperature, ammonia may be stored in essentially all sites of the SCR catalyst, but when the SCR warms up, i.e. has a higher temperature, only a small part of the sites may store ammonia. Therefore, the SCR catalyst may go from being essentially full of ammonia to being essentially empty of ammonia when the temperature increases. Also, if there is a heat wave moving downstream in the SCR catalyst, the ammonia within the SCR catalyst may be moved further and further towards the rear/downstream end of the SCR catalyst, until the ammonia finally leaves the SCR catalyst and is output as an ammonia slip.

Thus, there is a risk that plenty of ammonia is stored in the SCR catalyst when its temperature is low, and that this stored ammonia when the temperature increases will be output together with the exhaust gases from the SCR catalyst without having been used for reduction of nitrogen oxides $NO_x$ in the SCR catalyst, whereby a so called ammonia slip leaves the SCR catalyst together with the exhaust gases.

It is therefore an object to solve at least some of the above mentioned disadvantages.

The object is achieved by the above mentioned method for controlling at least one ammonia coverage degree for at least one selective catalytic reduction catalyst.

According to the method, at least one sectional ammonia coverage degree profile $NH_{3\_profile}$ for at least one SCR catalyst included in an exhaust gas treatment system arranged for treating an exhaust stream being output from a combustion engine is controlled.

The method includes determining at least one sectional ammonia coverage degree profile $NH_{3\_profile\_det}$ for the at least one SCR catalyst based on a flow F, a temperature T and a composition C of the exhaust stream upstream of the at least one SCR catalyst. The determination of the at least one sectional ammonia coverage degree profile $NH_{3\_profile\_det}$ here includes determining at least two sectional ammonia coverage degrees $NH_{3\_det\_1}$, $NH_{3\_det\_2}$, ..., $NH_{3\_det\_n}$ for the at least two sections of the at least one SCR catalyst.

The method also includes comparing the at least one sectional ammonia coverage degree profile $NH_{3\_profile\_det}$ with at least one sectional reference profile for an ammonia coverage degree $NH_{3\_profile\_ref}$ for the at least one SCR catalyst. The at least one sectional reference profile for the ammonia coverage degree $NH_{3\_profile\_ref}$ includes at least two sectional ammonia coverage reference degrees $NH_{3\_ref\_1}$, $NH_{3\_ref\_2}$, ..., $NH_{3\_ref\_n}$ for at least two sections of the at least one SCR catalyst. Thus, the comparison includes comparing the at least two determined sectional ammonia coverage degrees $NH_{3\_det\_1}$, $NH_{3\_det\_2}$, ..., $NH_{3\_det\_n}$ with the at least two sectional ammonia coverage reference degrees $NH_{3\_ref\_1}$, $NH_{3\_ref\_2}$, ..., $NH_{3\_ref\_n}$.

The method further includes controlling, based on the comparing of the at least one determined ammonia sectional coverage degree profile $NH_{3\_profile\_det}$ with the at least one sectional reference profile for an ammonia coverage degree $NH_{3\_profile\_ref}$, at least one of a concentration of nitrogen oxides $C_{NOx}$ in the exhaust stream to be output from the combustion engine and a dosage of a reductant including ammonia $NH_3$ to be injected into the exhaust stream upstream of the at least one SCR catalyst.

By usage of the present invention, SCR catalyst will produce as little ammonia slip as possible, at the same time as the exhaust treatment system provides for an efficient reduction of nitrogen oxides $NO_x$ in the exhaust stream.

The present invention uses an advanced model for controlling the engine output concentration of nitrogen oxides $C_{NOx}$ and/or the reductant dosage upstream of the SCR catalyst, which model takes a determined sectional ammonia coverage degree profile $NH_{3\_profile\_det}$ along the SCR catalyst and a corresponding sectional reference profile for an ammonia coverage degree $NH_{3\_profile\_ref}$ into account. This advanced control model makes it possible to optimize the reduction of nitrogen oxides $NO_x$ in the SCR catalyst, at the same time as the ammonia slip out of the SCR catalyst is minimized, also for operational states having been problematic for prior art solutions, such as e.g. for temperature transient operational states for which the temperature increases/decreases rapidly. The sectional reference profile $NH_{3\_profile\_ref}$ may be calculated based on an allowed/wanted amount of ammonia slip output from the outlet of SCR catalyst, and indicates the ammonia coverage degree along the SCR catalyst which will result in this allowed/wanted ammonia slip. Thus, the sectional reference profile $NH_{3\_profile\_ref}$ indicates a sectional ammonia coverage degree profile for the SCR catalyst which would be optimal in relation to the allowed/wanted ammonia slip out from the SCR catalyst. By including the sectional reference profile $NH_{3\_profile\_ref}$ in the control model, a very exact and efficient control of the engine output concentration of nitrogen oxides $C_{NOx}$ and/or the reductant dosage is provided. The sectional reference profile $NH_{3\_profile\_ref}$ generally indicates an available/possible capacity for reduction of nitrogen oxides $NO_x$ for the SCR catalyst, which is of course advantageous to take into consideration in the control model. This available/possible capacity may e.g. be compared with the current concentration of nitrogen oxides $NO_x$ being output from the engine, whereby it can be decided if the dosage of reductant and/or the nitrogen oxides output concentration should be adapted.

By usage of the present invention, the consumption of reductant and/or fuel may be reduced, while still providing sufficient reduction of nitrogen oxides $NO_x$, which minimizes emissions into the environment, including greenhouse gases.

The present invention may be implemented with none, or at least very little, addition to the constructional complexity of the engine and/or exhaust treatment systems.

Also, when the present invention is used, the size/volume of the SCR catalysts of the exhaust treatment system may be relatively small due to the efficient use of the SCR catalysts. Small sized SCR catalysts are of course advantageous, since there is often shortage of space for implementation of the exhaust treatment system in e.g. vehicles.

According to an embodiment of the present invention, if the comparison of the at least one sectional ammonia coverage degree profile $NH_{3\_profile\_det}$ with the at least one sectional reference profile for an ammonia coverage degree $NH_{3\_profile\_ref}$ indicates that there is a difference $Diff_{profiles}$ between the at least one sectional ammonia coverage degree profile $NH_{3\_profile\_det}$ and the at least one sectional reference profile for the ammonia coverage degree $NH_{3\_profile\_ref}$; then the control of the concentration of the engine output nitrogen oxides $C_{NOx}$ and/or the dosage of a reductant includes controlling at least one of the concentration of the engine output nitrogen oxides $C_{NOx}$ and the dosage of the reductant such that the difference $Diff_{profiles}$ is reduced. Hereby, the at least one sectional ammonia coverage degree profile $NH_{3\_profile}$ is adapted towards the sectional reference profile $NH_{3\_profile\_ref}$ whereby an optimized reduction of nitrogen oxides $NO_x$ is provided, while ammonia slip out from the SCR catalyst is avoided, or at least minimized.

According to an embodiment of the present invention, the difference $Diff_{profiles}$ is calculated as a weighted summation of at least two sectional differences $Diff_1, Diff_2, \ldots, Diff_n$ between at least two sectional ammonia coverage degrees $NH_{3\_det\_1}, NH_{3\_det\_2}, \ldots, NH_{3\_det\_n}$ and at least two sectional ammonia coverage reference degrees $NH_{3\_ref\_1}, NH_{3\_ref\_2}, \ldots, NH_{3\_ref\_n}$ for the at least one SCR catalyst, wherein each one of the at least two sectional differences $Diff_1, Diff_2, \ldots, Diff_n$ is weighted by a sectional weighting coefficient $W_1, W_2, \ldots, W_n$. Thus, at least two sectional weighting coefficient $W_1, W_2, \ldots, W_n$ are used for weighting the at least two sectional differences $Diff_1, Diff_2, \ldots, Diff_n$.

According to an embodiment of the present invention, the controlling further includes one or more in the group of:

adjusting the dosage of the reductant, in relation to a reference dosage needed for providing a reduction of said at least two sectional differences $Diff_1, Diff_2, \ldots, Diff_n$, with an amount of reductant being related to the weighted summation of the at least two sectional differences $Diff_1, Diff_2, \ldots, Diff_n$; and adjusting the concentration of nitrogen oxides $C_{NOx}$ in the exhaust stream to be output from the combustion engine, in relation to a reference concentration needed for providing a reduction of said at least two sectional differences $Diff_1, Diff_2, \ldots, Diff_n$, with a concentration adjustment being related to the weighted summation of the at least two sectional differences $Diff_1, Diff_2, \ldots, Diff_n$.

According to an embodiment of the present invention, the controlling further includes one or more in the group of:

multiplying the amount of reductant and/or the concentration adjustment with an overall control gain; and multiplying one or more of the at least two sectional weighting coefficients $W_1, W_2, \ldots, W_n$ used for calculating the weighted summation with a sectional control gain.

According to an embodiment of the present invention, the control of the concentration of engine output nitrogen oxides $C_{NOx}$ and/or the dosage of a reductant includes:

determining a capacity $CAP_{SCR\_NOx}$ for the at least one SCR catalyst to reduce nitrogen oxides $NO_x$ based on the sectional ammonia coverage degree profile $NH_{3\_profile\_det}$;

comparing the capacity $CAP_{SCR\_NOx}$ with a concentration of nitrogen oxides $C_{NOx}$ in the exhaust stream being output from the combustion engine; and determining, based on the comparing, if the concentration of nitrogen oxides $C_{NOx}$ output from the combustion engine and/or the dosage of the reductant should be adapted/adjusted by the herein presented control. This control may hereby be performed such that an optimized reduction of nitrogen oxides $NO_x$ is provided while ammonia slip out from the SCR catalyst is avoided, or at least minimized, since the at least one sectional ammonia coverage degree profile $NH_{3\_profile}$ is taken into account when determining the capacity $CAP_{SCR\_NOx}$.

According to an embodiment of the present invention, the control of the concentration of engine output nitrogen oxides $C_{NOx}$ includes one or more in the group of:

a selection of at least one injection strategy for the combustion engine;

a control of a timing for an injection of fuel into at least one cylinder of the combustion engine;

a control of injection pressure for an injection of fuel into at least one cylinder of the combustion engine;

a control of an injection phasing for an injection of fuel into at least one cylinder of the combustion engine;

a control of a device for exhaust recirculation (EGR); and a control of a contribution of the combustion engine to a total momentum being provided by a hybrid drivetrain comprising both the combustion engine and an electrical motor.

According to an embodiment of the present invention, an increase of the concentration of nitrogen oxides $C_{NOx}$ to be output from the combustion engine is achieved by one or more in the group of:

advancing a timing of an injection of fuel into at least one cylinder of the combustion engine;

increasing an injection pressure of an injection of fuel into at least one cylinder of the combustion engine;

controlling an injection phasing to provide a relatively large pressure gradient for an injection of fuel into at least one cylinder of the combustion engine; and reducing a fraction of the exhaust stream which is recirculated through a device for exhaust recirculation (EGR). By increasing the concentration of nitrogen oxides $C_{NOx}$ being output from the combustion engine, the combustion engine may be run with higher fuel efficiency.

According to an embodiment of the present invention, a decrease of the concentration of nitrogen oxides $C_{NOx}$ to be output from said combustion engine is achieved by one or more in the group of:

delaying a timing of an injection of fuel into at least one cylinder of the combustion engine;

reducing an injection pressure of an injection of fuel into at least one cylinder of the combustion engine;

controlling an injection phasing to provide a relatively small pressure gradient for an injection of fuel into at least one cylinder of the combustion engine; and increasing a fraction of the exhaust stream which is recirculated through a device for exhaust recirculation (EGR).

According to an embodiment of the present invention, the control of the sectional ammonia coverage degree profile $NH_{3\_profile}$ reduces an ammonia slip $NH_{3\_slip}$ from the at least one SCR catalyst to at least one Ammonia Slip Catalyst (ASC) arranged downstream of the at least one SCR catalyst, whereby a generation of nitrous oxide $N_2O$ in the at least one ASC is reduced. Hereby, less nitrous oxide $N_2O$ is then emitted into the environment from the ASC. Emission of nitrous oxide $N_2O$ may in the future be included in emission standards and regulations regarding emissions from combustion engines, wherefore it is advantageous to minimize the nitrous oxide $N_2O$ being output from the system, as long as an efficient reduction of nitrogen oxides $NO_x$ can still be made efficiently.

According to an embodiment of the present invention, the determination of the at least one sectional ammonia coverage degree profile $NH_{3\_profile\_det}$ for the at least one SCR catalyst is also based on one or more in the group of:

at least one measurement performed by usage of at least one nitrogen oxides $NO_x$ sensor located downstream of the at least one SCR catalyst;

at least one measurement performed by usage of at least one nitrogen oxides $NO_x$ sensor located downstream of at least one Ammonia Slip Catalyst (ASC) being arranged downstream of the at least one SCR catalyst;

at least one measurement performed by usage of at least one ammonia $NH_3$ sensor located downstream of the at least one SCR catalyst;

at least one measurement performed by usage of at least one ammonia $NH_3$ sensor located downstream of at least one Ammonia Slip Catalyst (ASC) being arranged downstream of the at least one SCR catalyst;

a combination of measurements performed by usage of at least one nitrogen oxides $NO_x$ sensor located downstream of the at least one SCR catalyst and/or downstream of at least one Ammonia Slip Catalyst (ASC) being arranged downstream of the at least one SCR catalyst and/or by usage of at least one ammonia $NH_3$ sensor located downstream of the at least one SCR catalyst and/or downstream of at least one Ammonia Slip Catalyst (ASC) being arranged downstream of the at least one SCR catalyst;

at least one estimation of a concentration of nitrogen oxides $NO_x$ in the exhaust stream downstream of the at least one SCR catalyst;

at least one estimation of a concentration of nitrogen oxides $NO_x$ in the exhaust stream downstream of at least one Ammonia Slip Catalyst (ASC) being arranged downstream of the at least one SCR catalyst;

at least one estimation of a concentration of ammonia $NH_3$ in the exhaust stream downstream of the at least one SCR catalyst;

at least one estimation of a concentration of ammonia $NH_3$ in the exhaust stream downstream of at least one Ammonia Slip Catalyst (ASC) being arranged downstream of the at least one SCR catalyst;

at least one measurement performed by usage of at least one nitrogen oxides $NO_x$ sensor located upstream of the at least one SCR catalyst; and at least one estimation of a concentration of nitrogen oxides $NO_x$ in the exhaust stream upstream of said at least one SCR catalyst.

The object is also achieved by the above mentioned computer program and computer program product implementing the method of the present invention.

The object is also achieved by the above mentioned system arranged for controlling an ammonia coverage degree for at least one selective catalytic reduction catalyst. The system includes:

a determination unit, arranged for determining at least one sectional ammonia coverage degree profile $NH_{3\_profile\_det}$ for the at least one SCR catalyst based on a flow F, a temperature T and a composition C of the exhaust stream upstream of the at least one SCR catalyst, wherein the determination of the at least one sectional ammonia coverage degree profile $NH_{3\_profile\_det}$ here includes determining at least two sectional ammonia coverage degrees $NH_{3\_det\_1}$, $NH_{3\_det\_2}$, ..., $NH_{3\_det\_n}$ for the at least two sections of the at least one SCR catalyst;

a comparison unit, arranged for comparing the at least one sectional ammonia coverage degree profile $NH_{3\_profile\_det}$ with at least one sectional reference profile for an ammonia coverage degree $NH_{3\_profile\_ref}$ for the at least one SCR catalyst, wherein the at least one sectional reference profile for the ammonia coverage degree $NH_{3\_profile\_ref}$ includes at least two sectional ammonia coverage reference degrees $NH_{3\_ref\_1}$, $NH_{3\_ref\_2}$, ..., $NH_{3\_ref\_n}$ for at least two sections of the at least one SCR catalyst, and the comparison includes comparing the at least two determined sectional ammonia coverage degrees $NH_{3\_det\_1}$, $NH_{3\_det\_2}$, ..., $NH_{3\_det\_n}$ with the at least two sectional ammonia coverage reference degrees $NH_{3\_ref\_1}$, $NH_{3\_ref\_2}$, ..., $NH_{3\_ref\_n}$; and a control unit, arranged for controlling, based on the comparison, at least one of a concentration of nitrogen oxides $C_{NOx}$ in the exhaust stream to be output from the combustion engine and a dosage of a reductant including ammonia $NH_3$ to be injected into the exhaust stream upstream of the at least one SCR catalyst.

The object is also achieved by the above mentioned vehicle including the system. The vehicle includes the engine, the exhaust gas treatment system and the system according to the present invention.

According to an embodiment of the present invention, the exhaust gas treatment system includes one in the group of:

one SCR catalyst;

one SCR catalyst downstream followed by one Ammonia Slip Catalyst (ASC);

at least two selective Catalytic Reduction ($SCR_1$, $SCR_2$) catalysts; and at least two selective Catalytic Reduction ($SCR_1$, $SCR_2$) catalysts, each one of the at least two selective Catalytic Reduction catalysts being followed downstream by an Ammonia Slip Catalyst ($ASC_1$, $ASC_2$).

Detailed exemplary embodiments and advantages of the method and system according to the invention will now be described with reference to the appended drawings illustrating some preferred embodiments.

BRIEF DESCRIPTION OF THE DRAWINGS

The invention will be illustrated in more detail below, along with the enclosed drawings, where similar references are used for similar parts, and where.

DETAILED DESCRIPTION OF EMBODIMENTS OF THE INVENTION

Figure 1:
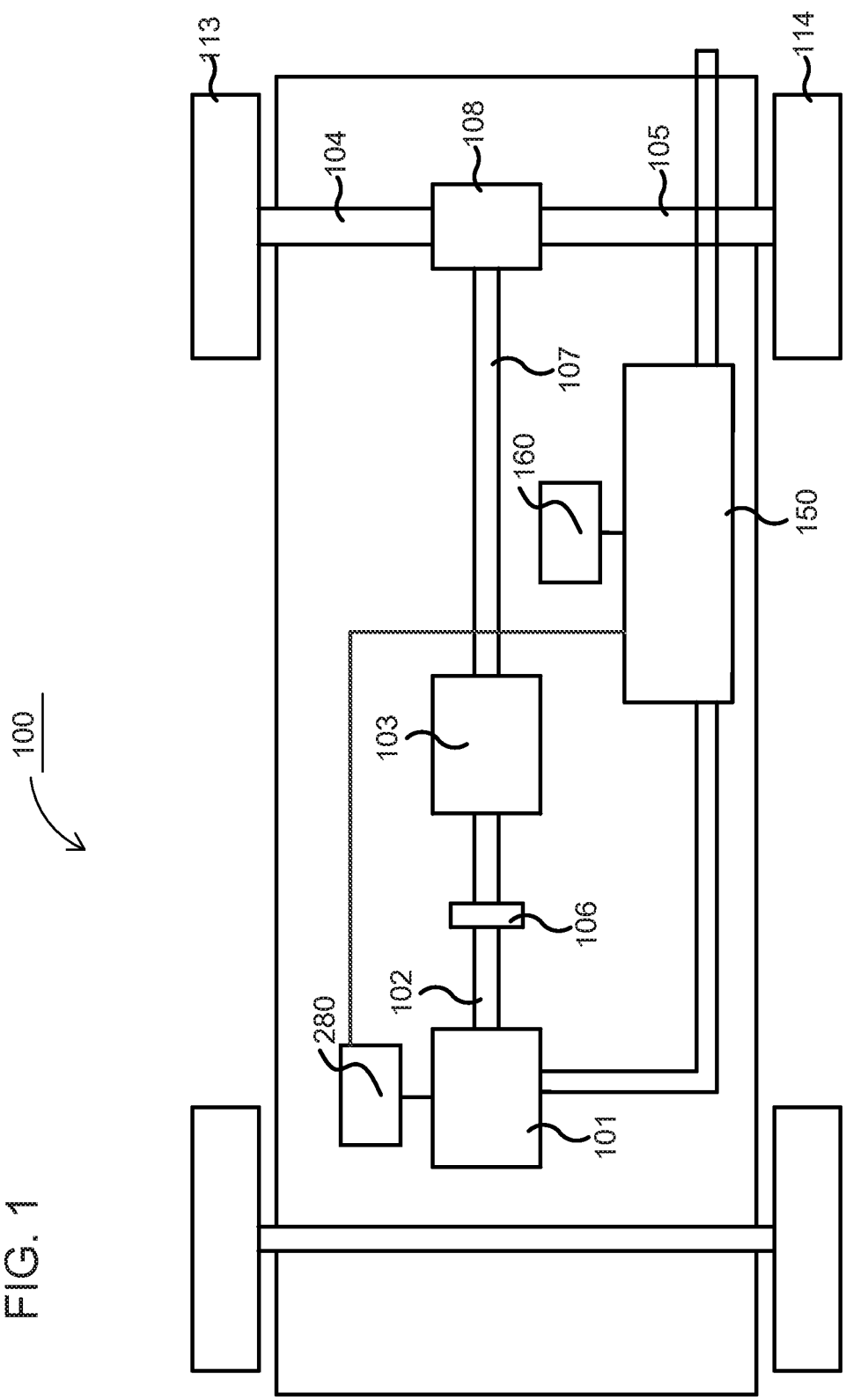
FIG. 1 shows an example vehicle which may comprise the present invention.

FIG. 1 schematically shows an example vehicle 100, comprising an exhaust treatment system 150, which may be an exhaust treatment system 150 being controlled according to one embodiment of the present invention. The power-train of the vehicle comprises a combustion engine 101, which in a customary manner, via an output shaft 102 on the combustion engine 101, usually via a flywheel, is connected to a gearbox 103 via a clutch 106.

The combustion engine 101 is controlled by the vehicle's control system via a control device 280, which may be connected to the exhaust treatment system 150. Likewise, the clutch 106 and the gearbox 103 may be controlled by the vehicle's control system with the help of one or more applicable control devices (not shown). Naturally, the vehicle's driveline may also be of another type, such as a type with a conventional automatic gearbox, of a type with a hybrid driveline, etc.

An output shaft 107 from the gearbox 103 drives the wheels 113, 114 via a final drive 108, such as e.g. a customary differential, and the drive shafts 104, 105 connected to the final drive 108.

The vehicle 100 thus also comprises an exhaust treatment system/exhaust purification system 150 for treatment/purification of exhaust emissions resulting from combustion in the combustion chamber of the combustion engine 101, which may comprise cylinders. The exhaust treatment system 150 may be controlled by the vehicle's control system, e.g. via a control device 160.

Figure 2A:
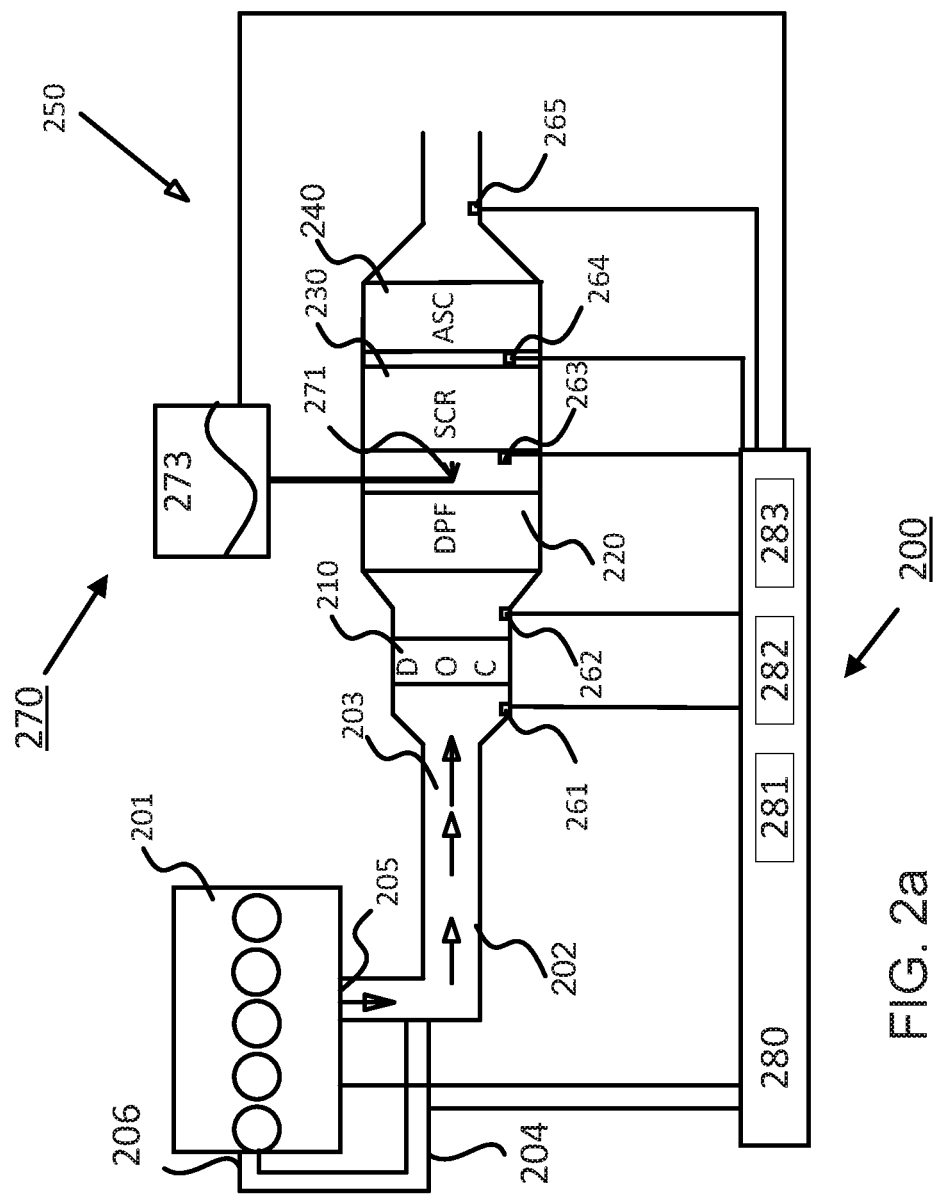
FIGS. 2a and 2b show examples of exhaust treatment systems for which the method and/or system according to the present invention may be implemented.
Figure 2B:
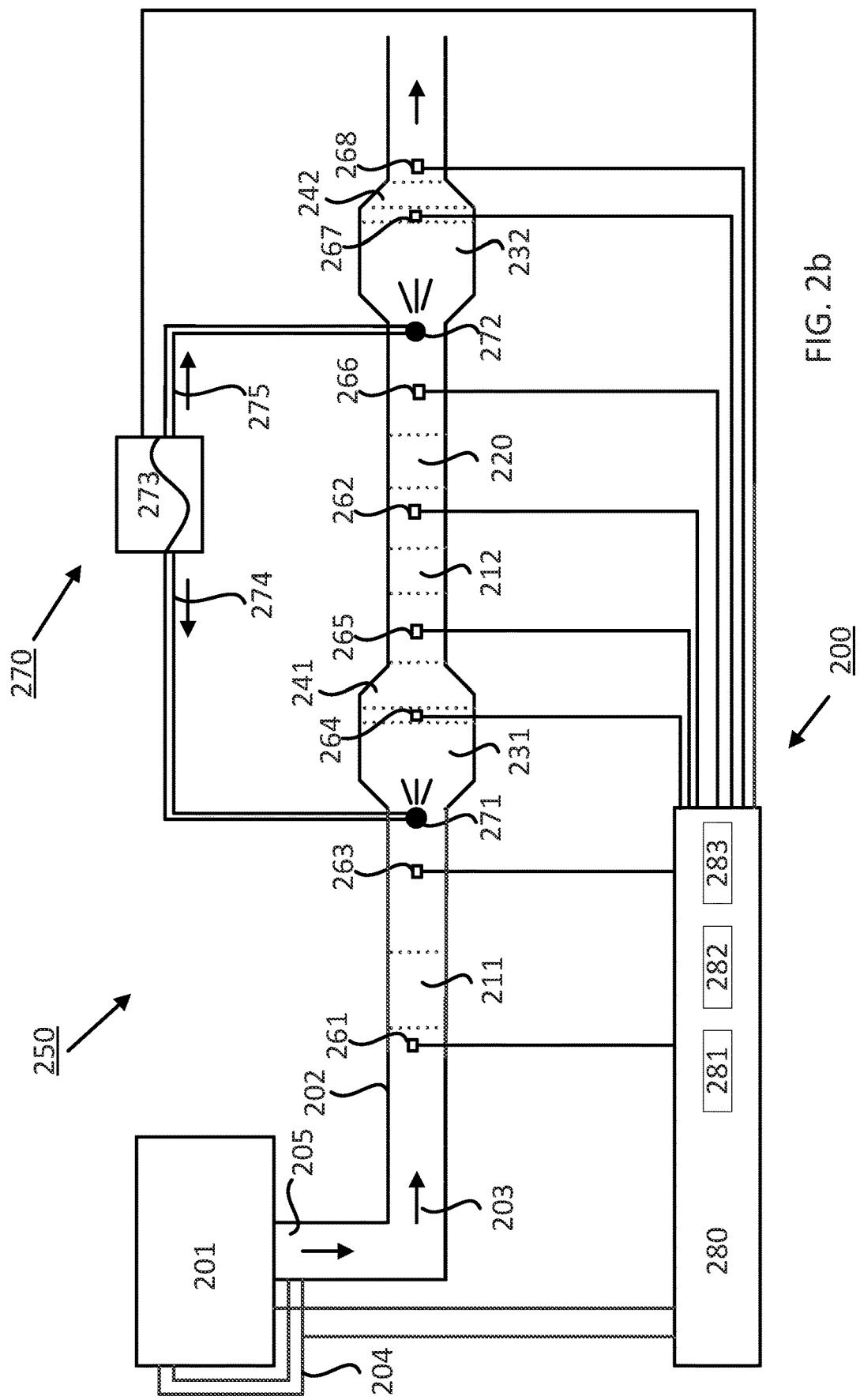

FIGS. 2a and 2b schematically show two non-limiting examples of exhaust treatment systems 250, in which the method according to the present invention may be used. In FIGS. 2a and 2b, similar devices have the same references. It should be noted that the present invention may be implemented in essentially any exhaust treatment system including at least one SCR catalyst, and that FIGS. 2a and 2b only illustrates two examples of such exhaust treatment systems.

In the systems displayed in FIGS. 2a and 2b, an exhaust pipe 202 is connected to a combustion engine 201.

FIG. 2a shows an exhaust treatment system 250, which may illustrate a so-called Euro VI-system. The exhaust stream 203 is led to a diesel particulate filter (DPF) 220, via a diesel oxidation catalyst (DOC) 210. During the combustion in the combustion engine, soot particles are formed, and the particulate filter DPF 220 is used to catch these soot particles. The exhaust stream 203 is here led through a filter structure, where soot particles are caught from the exhaust stream 203 passing through the filter structure, and are stored in the particulate filter 220.

The oxidation catalyst DOC 210 comprises an oxidising component, and is normally used primarily to oxidise, during the exhaust treatment, remaining hydrocarbons $C_xH_y$ (also referred to as HC) and carbon monoxide CO in the exhaust stream 203 into carbon dioxide $CO_2$ and water $H_2O$. The oxidation catalyst DOC 210 may also oxidise a large fraction of the nitrogen monoxides $NO_x$ occurring in the exhaust stream into nitrogen dioxide $NO_2$. The oxidation of nitrogen monoxide NO into nitrogen dioxide $NO_2$ is important for the nitrogen dioxide based soot oxidation in the filter, and is also advantageous at a potential subsequent reduction of nitrogen oxides $NO_x$. In this respect, the exhaust treatment system 250 comprises a SCR (Selective Catalytic Reduction) catalyst 230, arranged downstream of the particulate filter DPF 220. SCR catalysts use ammonia $NH_3$, or a composition from which ammonia may be generated/formed, e.g. urea, as an additive for the reduction of nitrogen oxides $NO_x$ in the exhaust stream. The reaction rate of this reduction is impacted by the ratio between nitrogen monoxide $NO_x$ and nitrogen dioxide $NO_2$ in the exhaust stream, so that the reduction's reaction is impacted in a positive direction by the previous oxidation of $NO_x$ into $NO_2$ in the oxidation catalyst DOC. This applies up to a value representing approximately 50% of the molar ratio $NO_2/NO_x$.

The SCR-catalyst 230 requires an additive to reduce the concentration of nitrogen oxides $NO_x$ in the exhaust stream 203. Such additive is injected into the exhaust stream 203 upstream of the SCR-catalyst 230 by a dosage device 271. Such additive is often ammonia and/or urea based, or comprises a substance from which ammonia may be extracted or released, and may for example comprise AdBlue, which basically includes urea mixed with water. Urea forms ammonia at heating (vaporization and thermolysis), and at heterogeneous catalysis on a metal oxide surface (hydrolysis), which surface may, for example, comprise titanium dioxide $TiO_2$, within the SCR-catalyst, or of a dedicated hydrolysis catalyst downstream of the dosage device 271.

The exhaust treatment system 250 exemplified in FIG. 2a is also equipped with an ammonia slip catalyst (ASC), which is arranged to oxidise a surplus/slip of additive that may remain after the SCR catalyst 230.

The exhaust treatment system 250 is also equipped with one or several sensors, such as one or several $NO_x$—, $NH_3$—, flow- and/or temperature-sensors 261, 262, 263, 264, 265, arranged for example at the inlet to the oxidation catalyst DOC 210, at the inlet to the particulate filter 220, at the inlet to the SCR catalyst 230, at the inlet to the ammonia slip catalyst ASC 240 and/or at the outlet from the ammonia slip catalyst ASC 240, for determination of concentrations of nitrogen oxides and/or ammonia, and/or for determination of temperatures in the exhaust treatment system.

The control device 280 is arranged to carry out control of the sectional ammonia coverage degree profile for the SCR catalyst 230 according to the present invention. This control may be based on signals from a number of sensors in the exhaust treatment system, among others on the one or several of the $NO_x$—, $NH_3$—, flow and/or temperature sensors 261, 262, 263, 264, 265.

The exhaust treatment system 250 may comprise a system 370 for supply of additive, which is arranged to supply the dosage device 271 in FIG. 2a with additives, that is to say for example ammonia or urea. One example of such a system 270 for supply of additive is shown schematically in FIG. 2a, wherein the system comprises the dosage device 271 arranged upstream of the SCR catalyst 230. The dosage device 271 often comprises dosage nozzles which administer additive to, and mix such additive with, the exhaust stream 203, and are supplied with additive from one or several tanks 273 for additive, via one or several conduits.

The system for supply of additive 270, including e.g. one or several pumps of the system 270, may be controlled by the control unit 280, which generates control signals for control of the supply of additive, so that a desired amount is injected into the exhaust stream 203 with the help of the dosage device 271 upstream of the SCR catalyst 230.

A device for exhaust recirculation (EGR) 204 may be included in the engine and exhaust treatment systems illustrated in FIG. 2a. The EGR device 204 is arranged for recirculating a portion of the exhaust gasses from the exhaust outlet 205 of the engine 201 to the air inlet 206 of the engine 201, which is well known for a skilled person.

FIG. 2b shows an exhaust treatment system 250, which comprises two SCR catalysts 231, 232. Exhausts generated at combustion in the engine 201, that is to say the exhaust stream 203 (indicated with arrows), are led past a first dosage device 271, arranged in the exhaust treatment system 250 to provide a first supply of a first additive to the exhaust stream 203. The exhaust treatment system 250 comprises a first $SCR_1$ catalyst 231, arranged downstream of the first dosage device 271, and arranged to provide a first reduction of a first amount of nitrogen oxides $NO_{x\_1}$ reaching the first $SCR_1$ catalyst 231. At this first reduction, which occurs in the first SCR catalyst 231, the first additive is used, which is supplied to the exhaust stream 203. The exhaust treatment system 250 may comprise a first ammonia slip catalyst $ASC_1$ 241 arranged downstream of the first $SCR_1$ catalyst 231 to oxidize a surplus of additive that may remain after the first $SCR_1$ catalyst 231.

The exhaust treatment system 250 also comprises a second dosage device 272, arranged downstream of the $SCR_1$ catalyst 231 to provide a second supply of a second additive to the exhaust stream 203. Downstream of the second dosage device 272, a second $SCR_2$ catalyst 232 is arranged, in order to provide a second reduction on a second amount of nitrogen oxides $NO_{x\_2}$ reaching the second $SCR_2$ catalyst 232. At this second reduction, the first and/or the second additives may be used, that are supplied to the exhaust stream by the first and second dosage devices 271, 272. The exhaust treatment system 250 may comprise a second ammonia slip catalyst $ASC_2$ 242 arranged downstream of the second $SCR_2$ catalyst 232 to oxidize a surplus/slip of additive that may remain after the second $SCR_2$ catalyst 231.

The exhaust treatment system may comprise a first oxidation catalyst $DOC_1$ 211, arranged upstream of the first dosage device 271 and/or a second oxidation catalyst $DOC_2$ 212, arranged downstream of the $SCR_1$ catalyst 231 and/or the $ASC_1$ 241. The first oxidation catalyst $DOC_1$ 311, and/or the second oxidation catalyst $DOC_2$ 312, are in that case arranged to oxidise nitrogen compounds, carbon compounds and/or hydrocarbon compounds in the exhaust stream 203 in the exhaust treatment system 250. At the oxidation in the first oxidation catalyst $DOC_1$ 211, a part of the nitrogen monoxides $NO_x$ in the exhaust stream 203 is oxidised into nitrogen dioxide $NO_2$.

The first oxidation catalyst $DOC_1$ 211, and/or the second oxidation catalyst $DOC_2$ 212, may at least partly be coated with a catalytic oxidising coating, wherein such oxidising coating may comprise at least one precious metal, for example platinum.

The exhaust system 250 comprises a particulate filter 220, downstream of the first $SCR_1$ catalyst 231 and/or the first $ASC_1$ 241, or downstream of the second oxidation catalyst $DOC_2$ 212, if this is comprised in the system. The particulate filter 220 is arranged to catch and oxidise soot particles. The exhaust stream 203 is here led through the filter structure of the particulate filter, where soot particles are caught in the filter structure from the exhaust stream 203 passing through, and are stored and oxidised in the particulate filter DPF 220.

The exhaust treatment system 250 may be equipped with one or several sensors, such as one or several $NO_x$—, $NH_3$—, flow- and/or temperature-sensors 261, 262, 263, 264, 265, 266, 267, 268, arranged as, for example, a sensor 261 at the inlet of the first oxidation catalyst $DOC_1$ 211, a sensor 263 at the inlet of the first $SCR_1$ catalyst 231, a sensor 264 at the outlet from the first $SCR_1$ catalyst 231 (at the inlet of the first $ASC_1$ 241), a sensor 265 at the outlet from the first $ASC_1$ (at the inlet of the second oxidation catalyst $DOC_2$ 212), a sensor 262 at the outlet from the second oxidation catalyst $DOC_2$ 212 (at the inlet of the filter 220), a sensor 266 at the inlet of the second $SCR_2$ catalyst 232, a sensor 267 at the outlet from the second $SCR_2$ catalyst 232 (at the inlet of the second $ACS_2$ 242) and/or a sensor 268 at the outlet from the second $ASC_2$ 242, for determination of nitrogen oxides, nitrogen dioxide, ammonia, flow F and/or temperatures of the exhausts in the exhaust treatment system.

The control device 280 is arranged to carry out control of the sectional ammonia coverage degree profile for the first $SCR_1$ 231 and second $SCR_2$ 232 catalysts according to the present invention, as is explained in this document. This control may be based on signals from a number of sensors in the exhaust treatment system, among others on the one or several of the $NO_x$—, $NH_3$—, flow and/or temperature sensors 261, 262, 263, 264, 265, 266, 267, 268 described herein.

The first and/or the second additives may comprise ammonia $NH_3$ or urea, from which ammonia may be generated/formed/released. These additives may for example comprise AdBlue. The first and second additives may be of the same type, or may be of different types.

The exhaust treatment system 250 may comprise a system 270 for supply of additive, which is arranged to supply the first 271 and the second 272 dosage devices in FIG. 2b, respectively, with additives, such as for example ammonia or urea.

One example of such a system 270 for supply of additive is shown schematically in FIG. 2b, wherein the system comprises the first dosage device 271 and the second dosage device 272, which are arranged upstream of the first $SCR_1$ catalyst 231, and upstream of the second $SCR_2$ catalyst 232, respectively. The first and second dosage devices 271, 272, often comprising dosage nozzles that administer additives to, and mix such additives with, the exhaust stream 203, are supplied with additives from one or several tanks 273 for additives, via one or several conduits 274, 275.

The system for supply of additive 270, including e.g. one or several pumps, may be controlled by the control unit 280, which generates control signals for control of supply of the additives, so that desired amounts are injected into the exhaust stream 203 with the help of the first 271 and the second 272 dosage devices upstream of the first $SCR_1$ 231 and the second $SCR_2$ 232 catalysts, respectively.

In this document, a selective catalytic reduction catalyst SCR means a traditional SCR-catalyst (Selective Catalytic Reduction). SCR catalysts usually use an additive, often ammonia $NH_3$, or a composition from which ammonia may be generated/formed, which is used for the reduction of nitrogen oxides $NO_x$ in the exhausts. The additive is injected into the exhaust stream resulting from the combustion engine, upstream of the catalyst as described above. The additive added to the catalyst is adsorbed (stored) in the catalyst, in the form of ammonia $NH_3$, so that a redox-reaction may occur between nitrogen oxides $NO_x$ in the exhausts and ammonia $NH_3$ available via the additive.

A device for exhaust recirculation (EGR) 204 may be included in the engine and exhaust treatment systems illustrated in FIG. 2b. The EGR device 204 is arranged for recirculating a portion of the exhaust gases from the exhaust outlet of the engine to the air inlet of the engine, which is well known for a skilled person.

Figure 3:
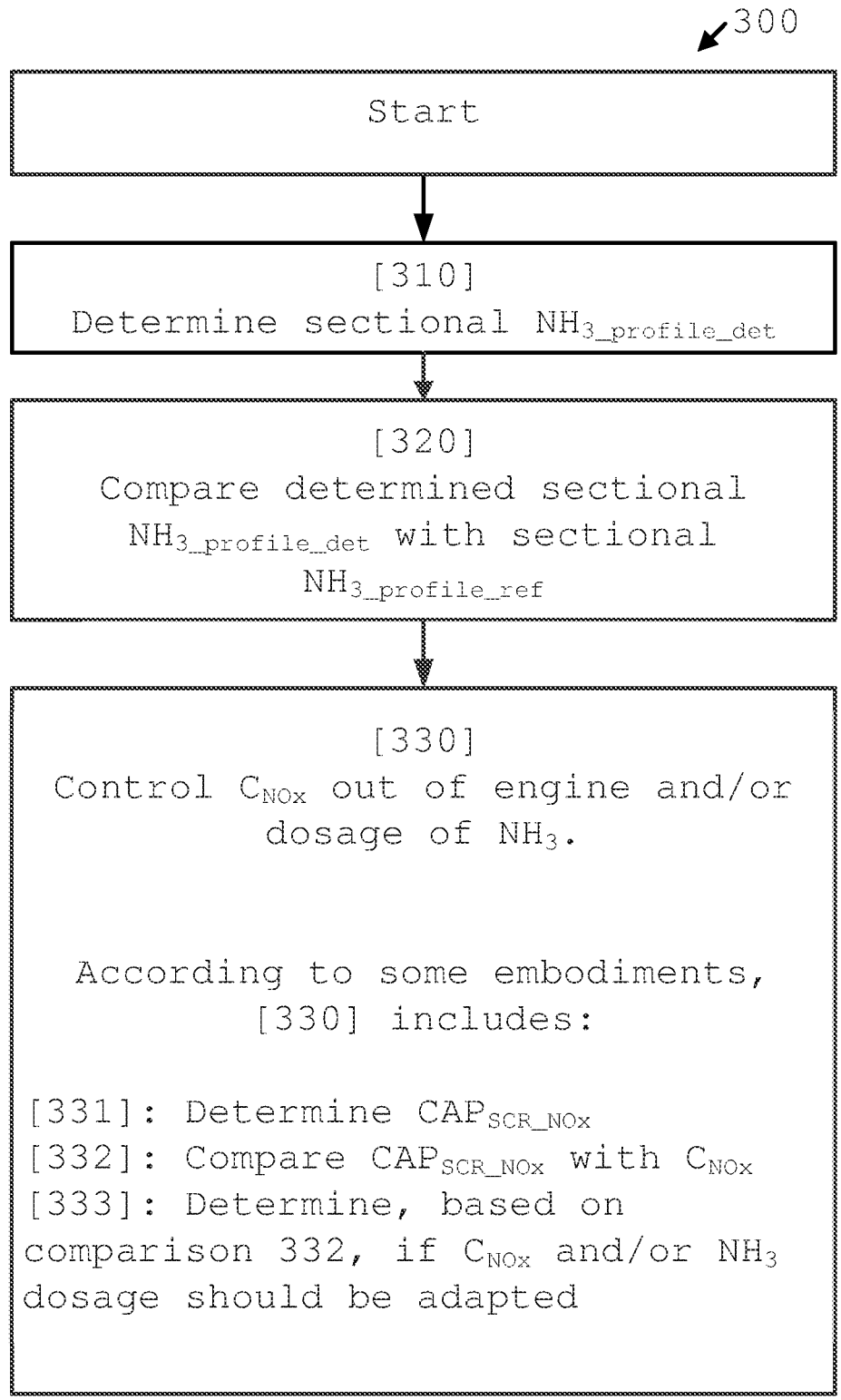
FIG. 3 shows a flow chart diagram for some embodiments of the method according to the present invention.

FIG. 3 shows a flow chart diagram illustrating the method 300 according to the present invention. As stated above, at least one sectional ammonia coverage degree profile $NH_{3\_profile}$ for a at least one SCR catalyst 230, 231, 232 included in an exhaust gas treatment system 250 arranged for treating an exhaust stream 203 being output from a combustion engine 201 is controlled by the method.

In a first step 310 of the method, at least one sectional ammonia coverage degree profile $NH_{3\_profile\_det}$ is determined for the at least one SCR catalyst 230, 231, 232, as described below, based on a flow F, a temperature T and a composition C of the exhaust stream 203 upstream of the at least one SCR catalyst 230, 231, 232. The determination of the at least one sectional ammonia coverage degree profile $NH_{3\_profile\_det}$ here includes determining at least two sectional ammonia coverage degrees $NH_{3\_det\_1}$, $NH_{3\_det\_2}, \ldots, NH_{3\_det\_n}$ for the at least two sections of the at least one SCR catalyst. As described more in detail below, the at least one SCR catalyst may here, according to various embodiments of the present invention, comprise a single SCR catalyst 230 or at least two $SCR_1$, $SCR_2$ catalysts 231, 232. When at least two $SCR_1$, $SCR_2$ catalysts 231, 232 are used, one sectional ammonia coverage degree profile $NH_{3\_profile\_det}$ is determined for each one of the at least two $SCR_1$, $SCR_2$ catalysts 231, 232.

In a second step 320 of the method, the at least one determined sectional ammonia coverage degree profile $NH_{3\_profile\_det}$ is compared with at least one sectional reference profile for an ammonia coverage degree $NH_{3\_profile\_ref}$ for the at least one SCR catalyst 230, 231, 232. The at least one sectional reference profile for the ammonia coverage degree $NH_{3\_profile\_ref}$ includes at least two sectional ammonia coverage reference degrees $NH_{3\_ref\_1}$, $NH_{3\_ref\_2}, \ldots, NH_{3\_ref\_n}$ for at least two sections of the at least one SCR catalyst. Thus, the comparison includes comparing the at least two determined sectional ammonia coverage degrees $NH_{3\_det\_1}$, $NH_{3\_det\_2}, \ldots, NH_{3\_det\_n}$ with the at least two sectional ammonia coverage reference degrees $NH_{3\_ref\_1}$, $NH_{3\_ref\_2}, \ldots, NH_{3\_ref\_n}$.

The at least one sectional reference profile $NH_{3\_profile\_det}$ and its determination is described below for an embodiment of the present invention. When at least two $SCR_1$, $SCR_2$ catalysts 231, 232 are used, a comparison for each one of the at least two $SCR_1$, $SCR_2$ catalysts 231, 232 with their respective sectional reference profiles $NH_{3\_profile\_ref}$ are performed.

In a third step 330 of the method, a concentration of nitrogen oxides $C_{NOx}$ in the exhaust stream 203 to be output from the combustion engine 201 and/or a dosage of a reductant including ammonia $NH_3$ to be injected into the exhaust stream 203 upstream of the at least one SCR catalyst 230, 231, 232 are controlled based on the comparison 320 of the at least one determined sectional ammonia coverage degree profile $NH_{3\_profile\_det}$ with the at least one sectional reference profile $NH_{3\_profile\_ref}$ of the second step 320 of the method. This control is described more in detail below for various embodiments of the present invention.

By usage of the present invention, the at least one SCR catalyst will produce as little ammonia slip as possible, at the same time as the exhaust treatment system provides for an efficient reduction of nitrogen oxides $NO_x$ in the exhaust stream.

The present invention uses an advanced model for controlling the engine output concentration of nitrogen oxides $C_{NOx}$ and/or the reductant dosage upstream of the at least one SCR catalyst, which model takes a sectional ammonia coverage degree profile $NH_{3\_profile\_det}$ along the at least one SCR catalyst into account. This advanced control model makes it possible to optimize the reduction of nitrogen oxides $NO_x$ in the at least one SCR catalyst, at the same time as the ammonia slip out of the at least one SCR catalyst is minimized, also for operational states having been problematic for prior art solutions, such as e.g. for temperature transient operational states for which the temperature increases/decreases rapidly.

In this document, the coverage degree denotes the degree/ratio/fraction of the ability of the SCR catalyst to store ammonia which is utilized, as is clear for a skilled person. Thus, the coverage degree indicates the ammonia stored along the SCR catalyst, i.e. in the sections of the SCR catalyst, in relation to a maximal amount of ammonia which could be stored in the SCR catalyst.

According to an embodiment of the present invention, the control performed in the third step 330 of the method includes controlling the concentration of nitrogen oxides $C_{NOx}$ and/or the reductant dosage such that a difference $Diff_{profiles}$ is reduced. This controlled reduction of the difference $Diff_{profiles}$ is performed if the comparison performed in the second step 320 of the method indicates that there is a difference $Diff_{profiles}$ between the at least one determined sectional ammonia coverage degree profile $NH_{3\_profile\_det}$ and the at least one sectional reference profile for the ammonia coverage degree $NH_{3\_profile\_ref}$. Hereby, the actual ammonia coverage profile $NH_{3\_profile}$ is controlled/adjusted towards the reference profile $NH_{3\_profile\_ref}$, whereby the use of the at least one SCR catalyst 230, 231, 232 is at least theoretically optimized.

According to an embodiment of the present invention, the exhaust treatment system 250 includes an ASC 240 arranged downstream of a single SCR catalyst 230 in the system 250, as illustrated in FIG. 2a. According to an embodiment of the present invention, the exhaust treatment system 250 includes an ASC 241, 242 arranged downstream of one or more of a first $SCR_1$ and a second $SCR_2$ catalyst 231, 232 in the system 250, as illustrated in FIG. 2b. Here, the control of the at least one sectional ammonia coverage degree profile $NH_{3\_profile}$ being provided by the method of the present invention reduces an ammonia slip $NH_{3\_slip}$ from the one or more SCR catalysts 230, 231, 232 to the one or more ASCs 240, 241, 242, respectively. The one or more slip catalysts ASCs 240, 241, 242 are arranged to oxidize/reduce the ammonia slip $NH_{3\_slip}$ from the one or more SCR catalysts 230, 231, 232, respectively. When the ammonia slip $NH_{3\_slip}$ is oxidized/reduced, nitrous oxide $N_2O$ is often generated for normal operating temperatures in the one or more ASCs 240, 241, 242. Thus, by usage of this embodiment of the present invention, the amount of ammonia slip $NH_{3\_slip}$ may be reduced by the improved control, and therefore also the amount of nitrous oxide $N_2O$ generated in the one or more ASCs 240, 241, 242 is reduced. This is advantageous, since less nitrous oxide $N_2O$ is then emitted into the environment from e.g. a vehicle including the combustion engine 101, 201 and the exhaust treatment system 250. Also, emission of nitrous oxide $N_2O$ may in the future be included in emission standards and regulations regarding emissions from combustion engines.

According to an embodiment of the present invention, the at least one sectional reference profile for the ammonia coverage degree $NH_{3\_profile\_ref}$ includes at least two sectional ammonia coverage reference degrees $NH_{3\_ref\_1}$, $NH_{3\_ref\_2}, \ldots, NH_{3\_ref\_n}$ for at least two sections of the SCR catalyst 230, 231, 232. These at least two sections may divide the SCR catalyst 230, 231, 232 along the length of the SCR catalyst 230, 231, 232, from its inlet to its outlet. The determination of the at least one sectional reference profile for the ammonia coverage degree $NH_{3\_profile\_ref}$ is explained more in detail below.

The determination 310 of the at least one sectional ammonia coverage degree profile $NH_{3\_profile\_det}$ may then include a determination of at least two corresponding sectional ammonia coverage degrees $NH_{3\_det\_1}$, $NH_{3\_det\_2}, \ldots, NH_{3\_det\_n}$ for the corresponding at least two sections of the SCR catalyst 230, 231, 232.

If the at least one sectional reference profile for the ammonia coverage degree $NH_{3\_profile\_ref}$ and the at least one determined sectional ammonia coverage degree profile $NH_{3\_profile\_det}$ include at least two sectional ammonia coverage degrees and at least two sectional ammonia coverage reference degrees, respectively, then also the above mentioned comparison 320 of the at least one sectional ammonia coverage degree profile $NH_{3\_profile\_det}$ with the at least one sectional reference profile for an ammonia coverage degree $NH_{3\_profile\_ref}$ may include comparisons of the at least two sectional ammonia coverage degrees $NH_{3\_det\_1}$, $NH_{3\_det\_2}, \ldots, NH_{3\_det\_n}$ with the at least two sectional ammonia coverage reference degrees $NH_{3\_ref\_1}$, $NH_{3\_ref\_2}, \ldots, NH_{3\_ref\_n}$, respectively.

According to an embodiment of the present invention, the difference $Diff_{profiles}$ between the at least one sectional ammonia coverage degree profile $NH_{3\_profile\_det}$ and the at least one sectional reference profile for the ammonia coverage degree $NH_{3\_profile\_ref}$ is calculated as a weighted summation of at least two sectional differences $Diff_1$, $Diff_2, \ldots, Diff_n$ between at least two sectional ammonia coverage degrees $NH_{3\_det\_1}$, $NH_{3\_det\_2}, \ldots, NH_{3\_det\_n}$ and at least two sectional ammonia coverage reference degrees $NH_{3\_ref\_1}$, $NH_{3\_ref\_2}, \ldots, NH_{3\_ref\_n}$, respectively, for the at least one SCR catalyst 230, 231, 232. In the weighted summation, each one of the at least two sectional differences $Diff_1$, $Diff_2, \ldots, Diff_n$ is weighted by a sectional weighting coefficient $W_1, W_2, \ldots, W_n$, whereby a total difference value based on all of the at least two sectional differences $Diff_1$, $Diff_2, \ldots, Diff_n$ is provided by the summation. The at least two sectional weighting coefficients $W_1, W_2, \ldots, W_n$, and the calculation/determination of the at least two sectional weighting coefficients $W_1, W_2, \ldots, W_n$ are described in detail below.

In general, when the sectional reference profile for the ammonia coverage degree $NH_{3\_profile\_ref}$ is calculated for a SCR catalyst, an ammonia slip $NH_3$ between the SCR catalyst and the ASC may be used as a calibration parameter. The needed ammonia coverage and ammonia concentrations are first calculated for a section at the downstream end of the SCR catalyst, i.e. at the outlet of the SCR catalyst. Then, these calculated needed ammonia coverage and ammonia concentrations for the downstream end section are used for calculating the needed ammonia coverage and ammonia concentrations for the next SCR catalyst section, i.e. for the section being located directly upstream of the downstream end section, and so on. Thus, from the downstream end section at the outlet of the SCR catalyst towards the upstream end section at the inlet of the SCR catalyst, the needed ammonia coverage and ammonia concentrations are calculated based on the foregoing calculations.

The herein mentioned at least one sectional reference profile for an ammonia coverage degree $NH_{3\_profile\_ref}$ is related to an available capacity for reduction of nitrogen oxides $NO_x$ for the at least one SCR catalyst 230, 231, 232, which according to an embodiment may be temperature dependent.

Generally, the below described reaction rate $r_{j,k}$ for the SCR catalyst conversion is temperature dependent, and a temperature balance results in a specific temperature for each section of the sectional SCR catalyst. Thus, the at least one sectional reference profile for an ammonia coverage degree $NH_{3\_profile\_ref}$ and/or the at least one sectional ammonia coverage degree profile $NH_{3\_profile\_det}$ may be temperature dependent, since the temperature influences the reaction rate for the conversion.

More in detail, a mass balance for gas component i in a SCR catalyst section k may be written as:

$$Fy_{i,k-1} - Fy_{i,k-1} - \Sigma_j v_{i,j} r_{j,k} w_k = 0 \qquad (1)$$

where:
F is a total molar flow for the gas;
$y_{i,k}$ is a molar fraction for the gas component i in the actual catalyst section k;
$y_{i,k-1}$ is a molar fraction for the gas component i in the catalyst section k−1;
$v_{i,j}$ is a stoichiometric coefficient for the gas component i in reaction j;
$r_{j,k}$ is a reaction rate for the reaction j in the actual catalyst section k; and
$w_k$ is an active material mass in the actual catalyst section k.

If the mass balance (1) is solved, the molar fraction $y_{i,k}$ for the gas component i in the actual catalyst section k is provided as a function of the molar fraction $y_{i,k-1}$ for the component in a previous/downstream SCR section, k−1.

For adsorbed ammonia $NH_3$ in the SCR catalyst, a time dependent mass balance may apply, which may be written as:

$$N \frac{d\theta_{NH_3,k}}{dt} = \sum_j v_{i,j} r_{j,k} \qquad (2)$$

Where:
N is a number of active sites in the SCR catalyst;
$\theta_{NH3,k}$ is a coverage of $NH_3$ in the SCR catalyst for the actual catalyst section k;
$v_{NH3,j}$ is a stoichiometric coefficient for $NH_3$ in reaction j; and
$r_{j,k}$ is a reaction rate for the reaction j in the actual catalyst section k.

The $NH_3$ coverage $\theta_{NH3,k}$ may be determined by a numerical integration of the time dependent mass balance with correction terms from the measurements:

$$N \frac{d\hat{\theta}_{NH_3,k}}{dt} = \gamma_k (\hat{y}_{NH_3} - y_{NH_3}) + \delta_k (\hat{y}_{NO_x} - y_{NO_x}) + \sum_j v_{NH_3,j} r_{j,k} \qquad (3)$$

where:
$N_{c,m}$ is a number of active sites in the SCR catalyst for a site of type m;
$\hat{\theta}_{NH_3,k}$ is the estimated $NH_3$ coverage for the actual catalyst section k;
$\hat{y}_{NH_3}$ is the estimated $NH_3$ molar fraction at the sensor position;

$y_{NH_3}$ is the measured $NH_3$ molar fraction at the sensor position;

$v_{NH3,j}$ is a stoichiometric coefficient for $NH_3$ in reaction j; and $r_{j,k}$ is a reaction rate for the reaction j in the actual catalyst section k;

$\gamma_k$ is a coefficient based either on a mathematical model or is empirically tuned to get an appropriate behavior of the estimator; and $\delta_k$ is a coefficient based either on a mathematical model or is empirically tuned to get an appropriate behavior of the estimator.

In this document, a logical/control unit, a model, an equation and/or instructions being adapted to estimate e.g. a coefficient may be denoted "estimator".

The values of the coefficients $\gamma_k$, $\delta_k$ may depend on the sensor setup, e.g. if there is a $NO_x$ sensor and/or $NH_3$ sensor available.

Further, a reference $NH_3$ coverage $\theta_{NH3,ref,k}$ for section k of the SCR catalyst may correspond to the $NH_3$ coverage which is in equilibrium/balance with the current conditions in each respective part of the SCR catalyst, wherein the current conditions may include values for the flow F, the temperature T and the gas composition C.

When the $NH_3$ coverage is in equilibrium, the time derivative of the $NH_3$ coverage is zero, which in one sense could be seen as a static operation. However, a true static operation would actually mean that also the temperature T of the SCR catalyst is in equilibrium, which is only the case if the upstream gas temperature has been constant for a sufficient time period. The sectional reference $NH_3$ coverage profile may thus be seen as describing a semi-static $NH_3$ coverages for a current catalyst temperature profile, which may itself be transient/non-static.

If the time derivative for the $NH_3$ coverage is set equal to zero, the equilibrium equation may be written as:

$$0 = \sum_j v_{NH_3,j} r_{j,k} = r_{ads,k} - r_{des,k} - \sum_{j=cons} v_{NH_3,j} r_{j,k} \qquad (4)$$

where:

$v_{NH3,j}$ is a stoichiometric coefficient for $NH_3$ in reaction j;

$r_{j,k}$ is a reaction rate for the reaction j in the actual catalyst section k;

$r_{ads,k}$ is a reaction rate for the adsorption of $NH_3$ in the actual catalyst section k;

$r_{des,k}$ is a reaction rate for the desorption of $NH_3$ in the actual catalyst section k; and $\Sigma_{j=cons} v_{NH3,j} r_{j,k}$ is a summation of reactions where $NH_3$ is consumed.

The reference $NH_3$ coverage $\theta_{NH3,ref,k}$ is determined starting with the last SCR catalyst section, i.e. with the most downstream section at the SCR catalyst outlet. A maximum allowed $NH_3$ molar fraction, $y_{NH3,max}$, is used in the expression for the adsorption term:

$$r_{ads,k} = k_{ads,k} c_{tot,k} y_{NH3,max,k} (1 - \theta_{NH3,ref,k}) \qquad (5)$$

where:

$r_{ads,k}$ is a reaction rate for the adsorption of $NH_3$ in the actual catalyst section k;

$k_{ads,k}$ is the rate constant for $NH_3$ adsorption in section k;

$c_{tot,k}$ is the total gas concentration in section k;

$y_{NH3,max,k}$ is the maximum allowed $NH_3$ molar fraction for section k;

$\theta_{NH3,ref,k}$ is a reference coverage of $NH_3$ in the SCR catalyst for the actual catalyst section k.

All other reaction terms comprise only coverage or coverage and molar fraction of other compounds than $NH_3$. For the reaction terms comprising molar fraction, the mass balance is solved using the molar fraction of the previous catalyst section. The last two terms in the equilibrium equation can thus be expressed as:

$$r_{des,k} + \sum_{j=cons} v_{NH3,j} r_{j,k} = f(k_{k,j}, \theta_{NH3,ref,k}, y_{i,k-1}) \qquad (6)$$

where:

$r_{des,k}$ is a reaction rate for the desorption of $NH_3$ in the actual catalyst section k;

$\Sigma_{j=cons} v_{NH3,j} r_{j,k}$ is a summation of reactions where $NH_3$ is consumed; and $f(k_{k,j}, \theta_{NH3,ref,k}, y_{i,k-1})$ is defined by the left hand side of (6) and indicates that this a function of the mentioned variables.

The equilibrium equation may then be solved with respect to $NH_3$ coverage using the maximum allowed $NH_3$ molar fraction $y_{NH3,max,k}$ and the actual upstream molar fraction for all other involved compounds.

With the reference coverage $\theta_{NH3,ref,k}$ determined, the maximum allowed $NH_3$ molar fraction for the previous catalyst section can now be determined as:

$$y_{NH3,max,k-1} = y_{NH3,max} + \frac{1}{F} \sum_{j=cons} v_{NH3,j} r_{j,k} w_k \qquad (7)$$

where:

$y_{NH3,max,k-1}$ is the maximum allowed $NH_3$ molar fraction for section k−1;

$y_{NH3,max,k}$ is the maximum allowed $NH_3$ molar fraction for section k;

$F_{tot}$ is a total molar flow for the gas; and $\Sigma_{j=cons} v_{NH3,j} r_{j,k} w_k$ is a summation of reactions where $NH_3$ is consumed; and $w_k$ is an active material mass in the actual catalyst section k.

The procedure is then repeated for each upstream catalyst section until the reference $NH_3$ coverage is determined for all catalyst sections.

The control signal $y_{NH3,control}$ for controlling the dosage of $NH_3$, and the control signal $y_{NOx,control}$ for controlling the concentration of nitrogen oxides $C_{NOx}$ in the exhaust stream 203 to be output from the combustion engine 201 may be computed according to:

$$y_{NH3,control} = y_{NH3,feedforward} + \Sigma_k \alpha_k (\theta_{NH3,ref,k} - \hat{\theta}_{NH3,k}) \qquad (8)$$

and $$y_{NOx,control} = y_{NOx,feedforward} + \Sigma_k \beta_k (\theta_{NH3,ref,k} - \hat{\theta}_{NH3,k}) \qquad (9)$$

Thus, the control signals are sums of a feedforward term $y_{NH3,feedforward}$, $y_{NOx,feedforward}$ and the weighted sum of the differences between the reference coverage $\theta_{NH3,ref,k}$ and the estimated coverage $\hat{\theta}_{NH3,k}$ for each segment/section k. The $NH_3$ feedforward term $y_{NH3,feedforward}$ may be computed during the reference coverage computational procedure, as described above. The $NO_x$ feedforward term $y_{NOx,feedforward}$ may be the nominal $NO_x$ output for the current combustion engine operating point as reported by the engine management system (EMS). The $NO_x$ feedforward term $y_{NOx, feedforward}$ may also be some other computed or pre-computed optimal $NO_x$ output for the current combustion engine operating point. The control signal $y_{NH3, control}$ might be sent from the control unit 280 to the system 270 for supply of additive/reductant in order to control the dosage of reductant. The control signal $y_{NOx, control}$ may be sent from the control unit 280 to the engine 201 and/or EGR 204 in order to control the concentration of nitrogen oxides $C_{NOx}$ in the exhaust stream 203. These control signals $y_{NH3, control}$, $y_{NOx, control}$ may thus be used for controlling the concentration of nitrogen oxides $C_{NOx}$ in the exhaust stream and/or the dosage of the reductant including ammonia $NH_3$ upstream of the at least one SCR catalyst 230, 231, 232, whereby at least one sectional ammonia coverage degree profile $NH_{3\_profile}$ for at least one SCR catalyst is controlled.

The coefficients $\alpha_k$ and $\beta_k$ may either be based on the mathematical model or are empirically tuned to get a satisfactory closed loop performance and robustness. The dynamics of controlling the stored ammonia $NH_3$ degree in the SCR catalyst by altering the reductant dosage is much slower compared to the dynamics of controlling the stored ammonia $NH_3$ degree in the catalyst by altering the $NO_x$ in the exhaust stream. If the coverage is, for example, higher than the reference at the downstream end of the SCR catalyst, i.e. at its outlet, then it is difficult to correct this by altering the reductant dosage. Therefore, the $\alpha_k$ coefficients are according to an embodiment typically diminishing in absolute value with increasing k, whereas the $\beta_k$ coefficients are typically increasing in absolute value with increasing k.

According to an embodiment of the present invention, illustrated in FIG. 3 the third method step 330 includes the step of determining 331 a capacity $CAP_{SCR\_NOx}$ for the at least one SCR catalyst 230, 231, 232 to reduce nitrogen oxides $NO_x$, where this capacity $CAP_{SCR\_NOx}$ is determined based on the at least one determined sectional ammonia coverage degree profile $NH_{3\_profile\_det}$.

The third method step 330 then further includes the step of comparing 332 the capacity $CAP_{SCR\_NOx}$ with a concentration of nitrogen oxides $C_{NOx}$ in the exhaust stream 203.

The third method step 330 then further includes the step of determining 333, based on the result of the comparison step 332, if the concentration of nitrogen oxides $C_{NOx}$ being output from the combustion engine 201 and/or the dosage of the reductant should be adjusted/adapted by the herein described control 330.

As stated above, the concentration of nitrogen oxides $C_{NOx}$ output from the combustion engine 201 and/or the dosage of the reductant upstream of the at least one SCR catalyst 230, 231, 232 is, according to the present invention, performed based on the comparison 320 of the at least one determined sectional ammonia coverage degree profile $NH_{3\_profile\_det}$ with the at least one sectional reference profile $NH_{3\_profile\_ref}$.

Generally, to control the ammonia coverage degree in the at least one SCR catalyst 230, 231, 232 by changing the dosage of the reductant is a relatively slow way to change/regulate the ammonia coverage degree of the at least one SCR catalyst 230, 231, 232. To control the ammonia coverage degree in the at least one SCR catalyst 230, 231, 232 by changing the concentration of nitrogen oxides $C_{NOx}$ being output from the combustion engine 201 is a relatively fast way to change/regulate the ammonia coverage degree of the at least one SCR catalyst 230, 231, 232.

The control 330 of the concentration of nitrogen oxides $C_{NOx}$ being output from the combustion engine 201 may be performed in a number of ways. For example, the concentration of output nitrogen oxides $C_{NOx}$ may be controlled by selecting at least one injection strategy for the combustion engine 201, which may include control of one or more fuel injection parameters for injections of fuel into at least one cylinder of the combustion engine 201, such as a timing for the injection, an injection pressure for the injection, and/or an injection phasing for the injection. The control 330 of the concentration of nitrogen oxides $C_{NOx}$ being output from the combustion engine 201 may also be performed by controlling an EGR device 204. For a vehicle including a hybrid drivetrain comprising both the combustion engine 201 and an electrical motor, the control 330 of the concentration of nitrogen oxides $C_{NOx}$ being output from the combustion engine 201 may also be performed by controlling the contribution of the combustion engine 201 to a total momentum being provided by the hybrid drivetrain.

According to an embodiment of the present invention, the control 330 of the concentration of nitrogen oxides $C_{NOx}$ being output from the combustion engine 201 may be based also on information related to a section of road ahead of a vehicle in which the system according to the present invention is implemented. This information may be based on one or more of positioning information, e.g. GPS (global positioning system) information, map information, topography information, weather reports, information communicated between vehicles and information communicated by radio. This information may comprise information related to prevailing topography, road curvature, traffic situation, roadworks, traffic density and road surface states. The information may further comprise e.g. one or more speed limits for the section of road ahead and one or more traffic signs pertaining to the road. Many vehicles today are provided with systems, e.g. navigation systems and cruise control systems, which use such information. This embodiment may therefore be implemented with little additional complexity in vehicles where the information is already available.

By use of one or more of the above described ways for controlling 330 the concentration of the output nitrogen oxides $C_{NOx}$, the concentration of the output nitrogen oxides $C_{NOx}$ may be increased in some situations in order to decrease the ammonia coverage degree such that the determined sectional ammonia coverage degree profile $NH_{3\_profile\_det}$ becomes more alike the sectional reference profile $NH_{3\_profile\_ref}$. Thus, the combustion engine 201 may e.g. according to these embodiments be controlled to emit a higher concentration of nitrogen oxides $C_{NOx}$, which may efficiently and relatively quickly empty the SCR catalyst e.g. during a temperature transient, such that the ammonia slip out from the SCR catalyst is efficiently reduced and/or eliminated. The concentration of nitrogen oxides $C_{NOx}$ being output from the combustion engine may during some time periods hereby be even higher than a maximum reduction limit for the SCR catalyst. Hereby, fuel efficiency of the combustion engine 201 may be increased at the same time as the ammonia slip is minimized.

For example, an increase of the concentration of nitrogen oxides $C_{NOx}$ being output from the combustion engine 201 may be achieved by adjusting at least one fuel injection parameter, such as advancing a timing of the injection, increasing an injection pressure of the injection, and/or controlling an injection phasing to provide a relatively large pressure gradient for the injection. The increase of the concentration of nitrogen oxides $C_{NOx}$ being output from the combustion engine 201 may also be achieved by reducing a fraction of the exhaust stream 203 which is recirculated through the EGR device 204.

Correspondingly, one or more of the above described ways for controlling 330 the concentration of the output nitrogen oxides $C_{NOx}$ may be used for decreasing the concentration of the output nitrogen oxides $C_{NOx}$ in some situations, in order to make the determined sectional ammonia coverage degree profile $NH_{3\_profile\_det}$ more alike like the sectional reference profile $NH_{3\_profile\_ref}$.

For example, the decrease of the concentration of nitrogen oxides $C_{NOx}$ being output from the combustion engine 201 may be achieved by adjusting at least one fuel injection parameter, such as delaying a timing of the injection, reducing an injection pressure of the injection, controlling an injection phasing to provide a relatively small pressure gradient for the injection. The decrease of the concentration of nitrogen oxides $C_{NOx}$ being output from the combustion engine 201 may also be achieved by increasing a fraction of the exhaust stream 203 being recirculated through the EGR device 204.

As described above, at least one sectional ammonia coverage degree profile $NH_{3\_profile\_det}$ for the at least one SCR catalyst 230, 231, 232 is according to the present invention determined 310 based on a flow F, a temperature T and a composition C of the exhaust stream 203 upstream of the at least one SCR catalyst 230, 231, 232. The at least one sectional ammonia coverage degree profile $NH_{3\_profile\_det}$ may for example be determined by any herein described estimator arranged for performing such a determination.

This at least one determined sectional ammonia coverage degree profile $NH_{3\_profile\_det}$ is then used in the control model for being compared with the at least one sectional reference profile for an ammonia coverage degree $NH_{3\_profile\_ref}$ for the at least one SCR catalyst 230, 231, 232.

As also described above, the exhaust treatment system 250 may be equipped with one or several sensors, such as for example one or several $NO_x$—, $NH_3$—, flow- and/or temperature-sensors 261, 262, 263, 264, 265, 266, 267, 268, arranged as, for example, a sensor 261 at the inlet to the first oxidation catalyst $DOC_1$ 211, a sensor 263 at the inlet to the first $SCR_1$ catalyst 231, a sensor 264 at the outlet from the first $SCR_1$ catalyst 231 (at the inlet to the first $ASC_1$ 241), a sensor 265 at the outlet from the first $ASC_1$ (at the inlet to the second oxidation catalyst $DOC_2$ 212), a sensor 262 at the outlet from the second oxidation catalyst $DOC_2$ 212 (at the inlet to the filter 220), a sensor 266 at the inlet to the second $SCR_2$ catalyst 232, a sensor 267 at the outlet from the second $SCR_2$ catalyst 232 (at the inlet to the second $ACS_2$ 242) and/or a sensor 268 at the outlet from the second $ASC_2$ 242, for determination of nitrogen oxides, nitrogen dioxide, ammonia, flow F and/or temperatures in the exhaust treatment system.

According to an embodiment of the present invention, the determination 310 of the at least one sectional ammonia coverage degree profile $NH_{3\_profile\_det}$ is also based on at least one measurement performed by usage of one or more of the nitrogen oxides $NO_x$ sensors 264, 265, 262, 266, 267, 268 located downstream of the one or more SCR catalysts 230, 231, 232.

According to an embodiment of the present invention, the determination 310 of the at least one sectional ammonia coverage degree profile $NH_{3\_profile\_det}$ is also based on at least one measurement performed by usage of one or more of the nitrogen oxides $NO_x$ sensors 265, 262, 266, 268 located downstream of the one or more ASCs 240, 241, 242. Here, the cross sensitivity for nitrogen oxides $NO_x$ and ammonia $NH_3$ for the $NO_x$ sensors 265, 262, 266, 268 is here mitigated since the $NO_x$ sensors 265, 262, 266, 268 located downstream of the one or more ASCs 240, 241, 242 are used. The one or more ASCs 240, 241, 242 eliminate slip of ammonia $NH_3$ in the exhaust gas stream before it reaches the $NO_x$ sensors 265, 262, 266, 268, wherefore the $NO_x$ sensors 265, 262, 266, 268 downstream of the ACSs only sense the nitrogen oxides $NO_x$ in the exhaust stream.

According to an embodiment of the present invention, the determination 310 of the at least one sectional ammonia coverage degree profile $NH_{3\_profile\_det}$ is also based on at least one measurement performed by usage of one or more of the ammonia $NH_3$ sensors 264, 265, 262, 266, 267, 268 located downstream of the one or more SCR catalysts 230, 231, 232.

According to an embodiment of the present invention, the determination 310 of the at least one sectional ammonia coverage degree profile $NH_{3\_profile\_det}$ is also based on at least one measurement performed by usage of the one or more ammonia $NH_3$ sensors 265, 262, 266, 268 located downstream of the one or more ASCs 240, 241, 242.

According to an embodiment of the present invention, the determination 310 of the at least one sectional ammonia coverage degree profile $NH_{3\_profile\_det}$ is also based on a combination of measurements performed by usage of the one or more nitrogen oxides $NO_x$ sensors 264, 265, 262, 266, 267, 268 located downstream of the one or more SCR catalysts 230, 231, 232 and/or downstream of the one or more ASCs 240, 241, 242 and/or by usage of the one or more ammonia $NH_3$ sensors 264, 265, 262, 266, 267, 268 located downstream of the one or more SCR catalysts 230, 231, 232 and/or downstream of the one or more ASCs 240, 241, 242.

According to an embodiment of the present invention, the determination 310 of the at least one sectional ammonia coverage degree profile $NH_{3\_profile\_det}$ is also based on at least one measurement performed by usage of the one or more nitrogen oxides $NO_x$ sensors 263, 266 located upstream of the one or more SCR catalysts 230, 231, 232.

According to an embodiment of the present invention, the determination 310 of the at least one sectional ammonia coverage degree profile $NH_{3\_profile\_det}$ is also based on one or more estimations of the concentration of nitrogen oxides $NO_x$ in the exhaust stream 203. Such estimations may for example be made for one or more positions in the exhaust treatment system corresponding to positions in which the above mentioned sensors are located.

Thus, according to an embodiment of the present invention, the determination 310 of the at least one sectional ammonia coverage degree profile $NH_{3\_profile\_det}$ is also based on at least one estimation of the concentration of nitrogen oxides $NO_x$ downstream of the one or more SCR catalysts 230, 231, 232.

According to an embodiment of the present invention, the determination 310 of the at least one sectional ammonia coverage degree profile $NH_{3\_profile\_det}$ is also based on at least one estimation of the concentration of nitrogen oxides $NO_x$ downstream of the one or more ASCs 240, 241, 242.

According to an embodiment of the present invention, the determination 310 of the at least one sectional ammonia coverage degree profile $NH_{3\_profile\_det}$ is also based on at least one estimation of the concentration of ammonia $NH_3$ downstream of the one or more SCR catalysts 230, 231, 232.

According to an embodiment of the present invention, the determination 310 of the at least one sectional ammonia coverage degree profile $NH_{3\_profile\_det}$ is also based on at least one estimation of the concentration of ammonia $NH_3$ downstream of the one or more ASCs 240, 241, 242.

According to an embodiment of the present invention, the determination 310 of the at least one sectional coverage degree profile $NH_{3\_profile\_det}$ is also based on at least one estimation of a concentration of nitrogen oxides $NO_x$ in the exhaust stream 203 upstream of the one or more SCR catalysts 230, 231, 232.

According to an embodiment of the present invention, the dosage controlling further includes adjusting the dosage of the reductant, in relation to a reference dosage needed for providing a reduction of the at least two sectional differences $Diff_1, Diff_2, \ldots, Diff_n$, with an amount of reductant being related to the weighted summation of the at least two sectional differences $Diff_1, Diff_2, \ldots, Diff_n$.

According to an embodiment of the present invention, the engine control of concentration of nitrogen oxides $C_{NOx}$ includes adjusting the concentration of nitrogen oxides $C_{NOx}$ in the exhaust stream to be output from the combustion engine, in relation to a reference concentration needed for providing a reduction of the at least two sectional differences $Diff_1, Diff_2, \ldots, Diff_n$, with a concentration adjustment being related to the weighted summation of the at least two sectional differences $Diff_1, Diff_2, \ldots, Diff_n$.

Generally, by usage of these embodiments, it is possible to determine the actual as well as the required $NH_3$ accumulation in the catalyst. Hereby, means are provided to establish a control concept that may keep the ammonia $NH_3$ accumulation close to the required accumulation.

The purpose of using an SCR model as a basis when controlling the ammonia/urea dosing is to be able to handle the dynamics of ammonia $NH_3$ accumulation in the SCR catalyst. In order to realize such a concept, two other parts than the model are also needed. Firstly, a required accumulation, which is related to the sectional reference profile for the ammonia coverage degree $NH_{3\_profile\_ref}$ is needed. Secondly a control method to keep the accumulation close to the required. Therefore, a control concept that forces the accumulation, being related to sectional ammonia coverage degree profile $NH_{3\_profile\_det}$, is towards the required is described. The control method is deduced from the herein described reference coverage and molar fraction profiles.

The accumulation of ammonia may depend on all four of the main operating conditions in the SCR catalyst, namely temperature, flow, ammonia $NH_3$ and/or nitrogen oxides $NO_x$ concentration, which is utilized by the herein described embodiments.

As mentioned above, the operating conditions varies over time, and so will also the $NH_3$ accumulation equilibrium. Therefore, the urea dosing needs to be adjusted according to the changes in ammonia $NH_3$ accumulation equilibrium when the operating conditions varies, i.e. a dynamic dosing is needed.

The static dosing and the equilibrium ammonium $NH_3$ accumulation that is needed to determine the dynamic dosing properties represent the static/reference values that are needed for the ammonium $NH_3$ accumulation control. Obtaining these values represents an optimization problem.

The required urea dosing is obtained from the sum of static and dynamic ammonia $NH_3$ dosing. In molar fraction this is expressed as:

$$y_{ref,urea} = \tfrac{1}{2}(y_{ref,NH_3,0} + y_{dyn,NH_3,0}), \qquad (10)$$

where the factor ½ represents number of urea molecules needed to form one $NH_3$ molecule. As a simplification, it is assumed that the urea is completely converted into $NH_3$. The urea flow is obtained by multiplying with the molar flow:

$$F_{ref,urea} = F y_{ref,urea} \qquad (11)$$

The static dosing represents the ammonia $NH_3$ that is consumed in the SCR catalyst when static/reference conditions are fulfilled. This is obtained directly from the $NH_3$ reference generation:

$$y_{ref,NH_3,0} \qquad (12)$$

The dynamic dosing represents an amount of reductant/ ammonia $NH_3$ that is either added to or subtracted from the static dosing in order to force the ammonia $NH_3$ accumulation, related to the sectional ammonia coverage degree profile $NH_{3\_profile\_det}$, towards the static coverage, related to the sectional reference profile for the ammonia coverage degree $NH_{3\_profile\_ref}$. The dynamic dosing is deduced from the dynamic $NH_3$ mass balance:

$$\frac{d\theta_{NH_3,k}}{dt} = \frac{1}{N} \{k_{ads,k} c_{tot,k} y_{NH_3,k}(1 - \theta_{NH_3,k}) - \qquad (13)$$
$$\{k_{des,k} - v_{red} k_{red,k} c_{tot,k} y_{NO_x,k} + v_{ox} k_{ox,k}\} \theta_{NH_3,k}\}$$

By multiplying both sides with catalyst mass and the number of sites, and by dividing with the molar flow, the net accumulation change rate in the same units as molar fraction is obtained:

$$\Delta y_{NH_3,k} = \frac{w_k}{F} \{k_{ads,k} c_{tot,k} y_{NH_3,k}(1 - \theta_{NH_3,k}) - \qquad (14)$$
$$\{k_{des,k} - v_{red} k_{red,k} c_{tot,k} y_{NO_x,k} + v_{ox} k_{ox,k}\} \theta_{NH_3,k}\}$$

At reference coverage and molar fractions, this equals zero:

$$0 = \frac{w_k}{F} \{k_{ads,k} c_{tot,k} y_{ref,NH_3,k}(1 - \theta_{ref,NH_3,k}) - \qquad (15)$$
$$\{k_{des,k} - v_{red} k_{red,k} c_{tot,k} y_{ref,NO_x,k} + v_{ox} k_{ox,k}\} \theta_{ref,NH_3,k}\}$$

Where
k denotes reaction rate coefficient;
v denotes stoichiometric coefficient;
ads denotes $NH_3$ adsorption;
des denotes $NH_3$ desorption;
red denotes $NO_x$ reduction; and
ox denotes $NH_3$ oxidation.

Now, let the coverage be perturbed from the reference condition with:

$$\theta_{NH_3,k} = \theta_{ref,NH_3,k} + \Delta\theta_{NH_3,k} \qquad (16)$$

Inserting this into the rewritten dynamic ammonia $NH_3$ mass balance, and subtracting the same equation at static/reference condition yields:

$$\Delta y_{dyn,NH_3,k} = -\frac{w_k}{F} \qquad (17)$$
$$\{c_{tot,k}(k_{ads,k} y_{ref,NH_3,k} + v_{red} k_{red,k} y_{ref,NO_x,k}) + k_{des,k} + v_{ox} k_{ox,k}\}$$
$$\Delta\theta_{NH_3,k}$$

This represents the amount of ammonia $NH_3$ needed to force the ammonia $NH_3$ accumulation, related to the sectional ammonia coverage degree profile $NH_{3\_profile\_det}$ towards the static coverage, related to the sectional reference profile for the ammonia coverage degree $NH_{3\_profile\_ref}$. The static mass balance for this dynamic ammonia $NH_3$ over a section can be written as:

$$y_{dyn,NH_3,k-1} = y_{dyn,NH_3,k} + \Delta y_{dyn,NH_3,k} \quad (18)$$

Thus, the total amount of reductant/ammonia $NH_3$ that is needed to force the ammonia $NH_3$ accumulation, related to the sectional ammonia coverage degree profile $NH_{3\_profile\_det}$, towards the static coverage, related to the sectional reference profile for the ammonia coverage degree $NH_{3\_profile\_ref}$, i.e. to reduce sectional differences $Diff_1$, $Diff_2$, ..., $Diff_n$ towards zero through the entire catalyst is:

$$y_{dyn,NH_3,0} = \sum_{k=1}^{K} \frac{w_k}{F} \{c_{tot,k}(k_{ads,k} y_{ref,NH_3,k} + v_{red}k_{red,k} y_{ref,NO_x,k}) + k_{des,k} + v_{ox}k_{ox,k}\} \quad (19)$$

$$(\theta_{ref,NH_3,k} - \theta_{NH_3,k})$$

The dynamic dosing is thus a weighted sum of the differences between the reference coverage, related to the sectional reference profile for the ammonia coverage degree $NH_{3\_profile\_ref}$, and the actual coverage, related to the sectional ammonia coverage degree profile $NH_{3\_profile\_det}$, over the catalyst sections:

$$y_{dyn,NH_3,0} = \Sigma_{k=1}^{K} w_{dyn,k}(\theta_{ref,NH_3,k} - \theta_{NH_3,k}) \quad (20)$$

Where the weight factor for each section is expressed as:

$$w_{dyn,k} = \frac{w_k}{F}\{c_{tot,k}(k_{ads,k} y_{ref,NH_3,k} + v_{red}k_{red,k} y_{ref,NO_x,k}) + k_{des,k} + v_{ox}k_{ox,k}\} \quad (21)$$

Thus, according to an embodiment of the present invention, the at least two sectional weighting coefficients $W_1$, $W_2$, ..., $W_n$ used for calculating said weighted summation are determined based on a sectional net change, i.e. an increase or a decrease, of an ammonia $NH_3$ storage rate in relation to a sectional coverage degree and the exhaust flow F. Hereby, each one of the at least two sectional weighting coefficients $W_1$, $W_2$, ..., $W_n$ relates the corresponding sectional difference $Diff_1$, $Diff_2$, ..., $Diff_n$ to the sectional net change, i.e. an increase or a decrease, of the ammonia $NH_3$ storage rate, scaled by the exhaust flow.

According to an embodiment of the present invention, as the ammonia $NH_3$ accumulation is influenced by the exhaust nitrogen oxides $NO_x$ content, controlling the engine out $NO_x$ is also a way to force the ammonia $NH_3$ accumulation, related to the sectional ammonia coverage degree profile $NH_{3\_profile\_det}$, towards the static coverage, related to the sectional reference profile for the ammonia coverage degree $NH_{3\_profile\_ref}$. Let engine out $NO_x$ be perturbed by a factor such that:

$$\Delta y_{NO_x,0} = \Delta c_{ctr,NO_x} y_{NO_x,0} \quad (22)$$

This perturbation factor represents the fractional change in engine out $NO_x$ that is needed to force the ammonium $NH_3$ accumulation towards the static coverage, in order to minimize the sectional difference $Diff_1$, $Diff_2$, ..., $Diff_n$. As all other conditions remain unchanged the nitrogen oxides $NO_x$ molar fraction in all catalyst sections is perturbed by the same factor such that:

$$y_{ctr,NO_x,k} = y_{NO_x,k} + \Delta c_{ctr,NO_x} y_{NO_x,k} \quad (23)$$

Inserting this into the rewritten mass balance for adsorbed ammonia $NH_3$, i.e. equation (14) above, and subtracting the same equation at reference condition yields:

$$\Delta y_{ctr,NH_3,k} = -\Delta c_{ctr} \frac{w_k}{F} v_{red}k_{red,k} c_{tot,k} y_{ref,NO_x,k} \theta_{ref,NH_3,k} \quad (24)$$

This represents the corresponding change in local ammonia $NH_3$ molar fraction that the perturbed engine out nitrogen oxides $NO_x$ forces the ammonia $NH_3$ accumulation towards the static coverage. The static mass balance for this effect on ammonia $NH_3$ over a section can be written as:

$$y_{ctr,NH_3,k-1} = y_{ctr,NH_3,k} + \Delta y_{ctr,NH_3,k} \quad (25)$$

Thus, the total corresponding change in dosed ammonia $NH_3$ that the perturbed engine out nitrogen oxides $NO_x$ forces the ammonia $NH_3$ accumulation towards the static coverage through the entire catalyst is (whereby a change in dosed ammonia $NH_3$ is related to a change in engine out nitrogen oxides $NO_x$):

$$y_{ctr,NH_3,0} = -\Delta c_{ctr,NO_x} \sum_{k=1}^{K} \frac{w_k}{F} v_{red}k_{red,k} c_{tot,k} y_{ref,NO_x,k} \theta_{ref,NH_3,k} \quad (26)$$

Setting this change in dosed ammonia $NH_3$ equal to the dynamic dosing, i.e. equation (19) above, yields the following expression for the engine out $NO_x$ control factor:

$$\Delta c_{ctr,NO_x} = -\frac{\sum_{k=1}^{K} \frac{w_k}{F}\{c_{tot,k}(k_{ads,k} y_{ref,NH_3,k} + v_{red}k_{red,k} y_{ref,NO_x,k}) + k_{des,k} + v_{ox}k_{ox,k}\}}{\sum_{k=1}^{K} \frac{w_k}{F} v_{red}k_{red,k} c_{tot,k} y_{ref,NO_x,k} \theta_{ref,NH_3,k}} \quad (27)$$

$$(\theta_{ref,NH_3,k} - \theta_{NH_3,k})$$

This is also a weighted sum of the differences between reference coverage, i.e. the sectional reference profile for the ammonia coverage degree $NH_{3\_profile\_ref}$, and the actual coverage, i.e. the sectional ammonia coverage degree profile $NH_{3\_profile\_det}$, over the catalyst sections:

$$\Delta c_{ctr,NO_x} = \Sigma_{k=1}^{K} w_{NO_x,k}(\theta_{ref,NH_3,k} - \theta_{NH_3,k}) \quad (28)$$

Where the weight factor for each section is expressed as:

$$w_{NO_x,k} = -\frac{\frac{w_k}{F}\{c_{tot,k}(k_{ads,k} y_{ref,NH_3,k} + v_{red}k_{red,k} y_{ref,NO_x,k}) + k_{des,k} + v_{ox}k_{ox,k}\}}{\sum_{k=1}^{K} \frac{w_k}{F} v_{red}k_{red,k} c_{tot,k} y_{ref,NO_x,k} \theta_{ref,NH_3,k}} \quad (29)$$

Thus, according to an embodiment of the present invention, the at least two sectional weighting coefficients $W_1$, $W_2$, ..., $W_n$ used for calculating said weighted summation are determined based on a sectional net change, i.e. an increase or a decrease, of an ammonia $NH_3$ storage rate in relation to a sectional coverage degree and a converted exhaust flow of nitrogen oxides $NO_x$ through the at least one SCR catalyst 230, 231, 232. Hereby, each one of the at least two sectional weighting coefficients $W_1, W_2, \ldots, W_n$ relates the corresponding sectional difference $\text{Diff}_1, \text{Diff}_2, \ldots, \text{Diff}_n$ to the sectional net change, i.e. an increase or a decrease, of the ammonia $NH_3$ storage rate, scaled by the converted exhaust flow of nitrogen oxides $NO_x$ through the at least one SCR catalyst 230, 231, 232.

The dynamic reductant dosing and the engine out nitrogen oxides $NO_x$ control may be combined. For example, when the sum of static and dynamic dosing is negative, the negative part may, according to an embodiment, be actuated by increasing the engine out nitrogen oxides $NO_x$ instead. Another case is when there is an upper limitation in dosing, where, according to an embodiment, the engine out nitrogen oxides $NO_x$ may be decreased. It is also possible to always partly use the engine out nitrogen oxides $NO_x$ control in order to reduce fuel consumption.

According to an embodiment of the present invention, the above mentioned amount of reductant and/or the concentration adjustment used for adjusting the dosage and/or for adjusting the output concentration of nitrogen oxides are multiplied with an overall control gain. More in detail, the weighted summation of the at least two sectional differences $\text{Diff}_1, \text{Diff}_2, \ldots, \text{Diff}_n$ described herein is, according to the embodiment multiplied with the overall control gain. When adjusting the dosage of reductant, the static reductant dosing is not multiplied by the overall control gain, but the dynamic reductant dosing is multiplied, and therefore also altered, by the overall control gain. Correspondingly, when adjusting the output concentration of nitrogen oxides, only the engine out $NO_x$ control factor $\Delta c_{ctr,NO_x}$ is multiplied with the gain, i.e. the perturbation factor representing the fractional change in engine out $NO_x$ may be written as (where "gain" is the overall control gain):

$$\Delta y_{NO_x,0} = (1 + \text{gain} \cdot \Delta c_{ctr,NO_x}) y_{NO_x,0} \tag{30}$$

As mentioned above, this perturbation factor represents the fractional change in engine out $NO_x$ that is needed to force the ammonium $NH_3$ accumulation towards the static coverage, in order to minimize the sectional difference $\text{Diff}_1, \text{Diff}_2, \ldots, \text{Diff}_n$.

The dynamic dosing and the engine out nitrogen oxides $NO_x$ control factor yields a control action that is of the same magnitude as the total rate of nitrogen oxides $NO_x$ conversion through the SCR catalyst. In order to achieve a slower or faster approach towards the reference, i.e. towards minimized sectional differences, an overall control gain may be applied on the dynamic dosing and the engine out nitrogen oxides $NO_x$ control factor. This gain may, according to an embodiment, also be dependent on one or more operating conditions.

According to an embodiment of the present invention, the above mentioned at least two sectional weighting coefficients $W_1, W_2, \ldots, W_n$ used for calculating the weighted summation are multiplied with a sectional control gain. As all control actions have immediate impact on the inlet position of the SCR catalyst and the dynamic of upstream positions attenuate the impact of control actions on downstream positions, it takes relatively longer time to reach the reference for downstream positions. In order to achieve a faster approach towards reference, i.e. towards minimized sectional differences, for downstream positions, sectional gains, e.g. having a value larger than one could be applied on/multiplied to the weight factors for such downstream positions.

A person skilled in the art will realise that a method for treatment of an exhaust stream according to the present invention, may also be implemented in a computer program, which when executed in a computer will cause the computer to execute the method. The computer program usually comprises a part of a computer program product 403, where the computer program product comprises a suitable non-volatile/permanent/persistent/durable digital storage medium, on which the computer program is stored. The non-volatile/permanent/persistent/durable computer readable medium comprises a suitable memory, e.g.: ROM (Read-Only Memory), PROM (Programmable Read-Only Memory), EPROM (Erasable PROM), Flash, EEPROM (Electrically Erasable PROM), a hard disk device, etc.

Figure 4:
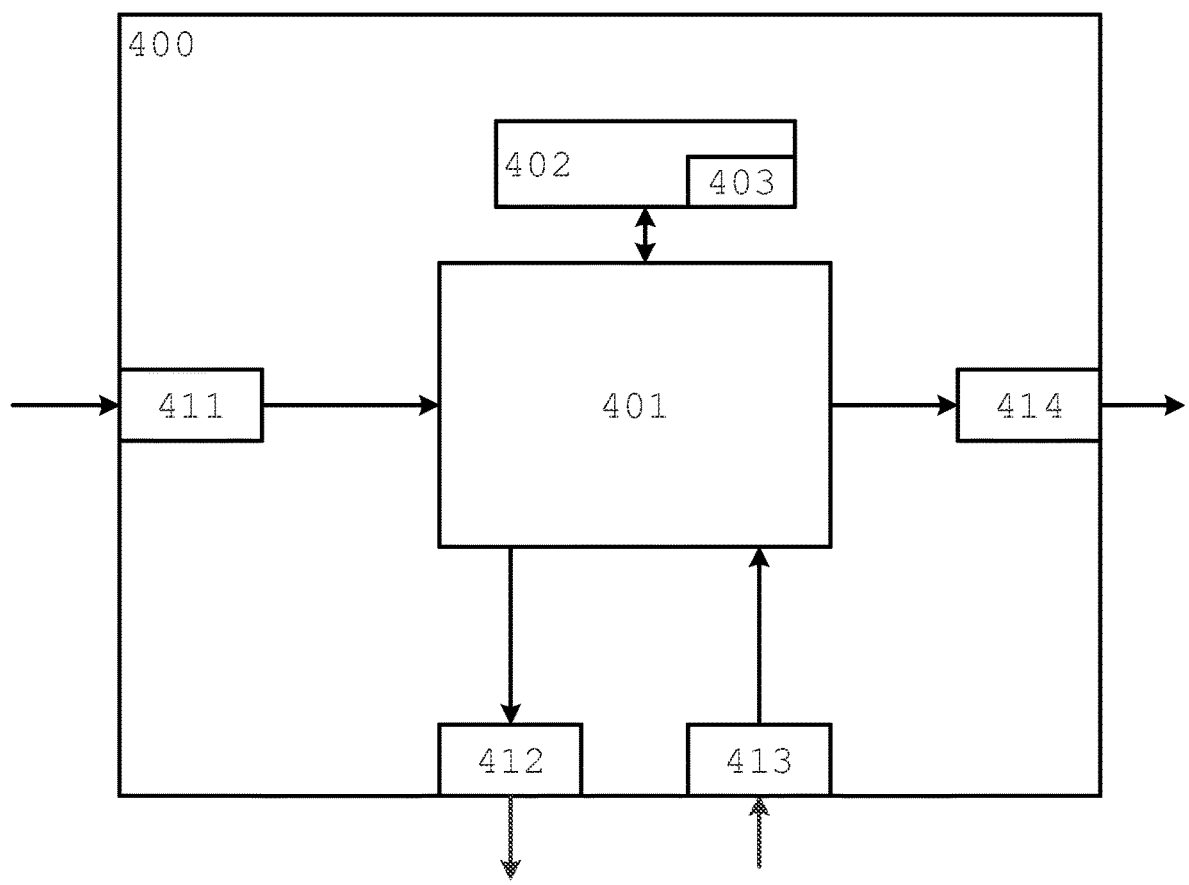
FIG. 4 shows a control device in which a method according to the present invention may be implemented.

FIG. 4 schematically shows a control device 400. The control device 400 comprises a calculation device 401, which may comprise essentially a suitable type of processor or microcomputer, e.g. a circuit for digital signal processing (Digital Signal Processor, DSP), or a circuit with a predetermined specific function (Application Specific Integrated Circuit, ASIC). The calculation device 401 is connected to a memory unit 402 installed in the control device 400, providing the calculation device 401 with e.g. the stored program code and/or the stored data which the calculation device 401 needs in order to be able to carry out calculations. The calculation device 401 is also set up to store interim or final results of calculations in the memory device 402.

Further, the control device 400 is equipped with devices 411, 412, 413, 414 for receiving and sending of input and output signals. These input and output signals may contain wave shapes, pulses or other attributes, which may be detected as information by the devices 411, 413 for the receipt of input signals and may be converted into signals that may be processed by the calculation device 401. These signals are then provided to the calculation device 401. The devices 412, 414 for sending output signals are arranged to convert the calculation result from the calculation unit 401 into output signals, for transfer to other parts of the vehicle's control system, and/or the component(s) for which the signals are intended, for example the fuel injections system of the engine, the EGR system, and/or the first and/or second dosage devices.

Each one of the connections to the devices for receiving and sending of input and output signals may comprise one or several of a cable; a data bus, such as a CAN (Controller Area Network) bus, a MOST (Media Oriented Systems Transport) bus, or any other bus configuration; or of a wireless connection.

A person skilled in the art will realise that the above-mentioned computer may comprise the calculation device 401, and that the above-mentioned memory may comprise the memory device 402.

Generally, control systems in modern vehicles comprise a communications bus system, including one or several communications buses to connect a number of electronic control devices (ECUs), or controllers, and different components localised on the vehicle. Such a control system may comprise a large number of control devices, and the responsibility for a specific function may be distributed among more than one control device. Vehicles of the type shown thus often comprise significantly more control devices than what is shown in FIG. 4, which is well known to a person skilled in the art within the technology area.

The present invention, in the embodiment shown, is implemented in the control device 400. The invention may, however, also be implemented wholly or partly in one or several other control devices already existing in the vehicle, or in a control device dedicated to the present invention.

Here, and in this document, devices are often described as being arranged to carry out steps in the method according to the invention. This also comprises that the devices are adapted and/or set up to carry out these method steps.

According to an aspect of the present invention, a system 200 is presented, which is arranged for controlling a sectional ammonia coverage degree profile $NH_{3\_profile\_det}$ for at least one SCR catalyst 230, 231, 232 included in an exhaust gas treatment system 250 arranged for treating an exhaust stream 203 output from a combustion engine 201, as illustrated in FIGS. 2a-2b.

The system 200 includes a determination unit 281, which is arranged for determining 310 at least one sectional ammonia coverage degree profile $NH_{3\_profile\_det}$ for the at least one SCR catalyst 230, 231, 232 in the exhaust treatment system 250. The determination is performed based on a flow F, a temperature T and a composition C of the exhaust stream 203 upstream of the SCR catalyst 230, 231, 232. The determination of the at least one sectional ammonia coverage degree profile $NH_{3\_profile\_det}$ here includes determining at least two sectional ammonia coverage degrees $NH_{3\_det\_1}$, $NH_{3\_det\_2}, \ldots, NH_{3\_det\_n}$ for the at least two sections of the at least one SCR catalyst. The determination unit 281 may here be adapted to perform all herein described embodiments for the determination 310 of at least one sectional ammonia coverage degree profile $NH_{3\_profile\_det}$.

The system 200 also includes a comparison unit 282, which is arranged for comparing 320 the at least one sectional ammonia coverage degree profile $NH_{3\_profile\_det}$ with at least one sectional reference profile for an ammonia coverage degree $NH_{3\_profile\_ref}$ for the at least one SCR catalyst 230, 231, 232. The at least one sectional reference profile for the ammonia coverage degree $NH_{3\_profile\_ref}$ includes at least two sectional ammonia coverage reference degrees $NH_{3\_ref\_1}, NH_{3\_ref\_2}, \ldots, NH_{3\_ref\_n}$ for at least two sections of the at least one SCR catalyst. Thus, the comparison includes comparing the at least two determined sectional ammonia coverage degrees $NH_{3\_det\_1}$, $NH_{3\_det\_2}, \ldots, NH_{3\_det\_n}$ with the at least two sectional ammonia coverage reference degrees $NH_{3\_ref\_1}$, $NH_{3\_ref\_2}, \ldots, NH_{3\_ref\_n}$.

The comparison unit 282 may here be adapted to perform all herein described embodiments for comparison of $NH_{3\_profile\_det}$ with $NH_{3\_profile\_ref}$.

The system further includes a control unit 283, which is arranged for controlling 330, based on the comparison 320 of $NH_{3\_profile\_det}$ with $NH_{3\_profile\_ref}$, a concentration of nitrogen oxides $C_{NOx}$ in in the exhaust stream 203 to be output from the combustion engine 201 and/or a dosage of a reductant including ammonia $NH_3$ to be injected into the exhaust stream 203 upstream of the at least one SCR catalyst 230, 231, 232. The control unit 283 may here be adapted to perform all the herein described embodiments for control of the concentration of nitrogen oxides $C_{NOx}$ in in the exhaust stream 203 and/or the dosage of the reductant.

The system according to the present invention may be arranged to perform all of the method embodiments described above and in the claims, so that the system for the respective embodiments obtains the above described advantages for the respective embodiments.

According to an aspect, the present invention may be implemented in a vehicle 100 including the engine 101, 201, the exhaust gas treatment system 250, the system 200 according to the present invention, and possibly also other vehicle parts/units/devices, e.g. as described in FIG. 1.

As mentioned above in connection with FIGS. 2a and 2b, the exhaust gas treatment system 250 may have many forms, and may include one or more of one SCR catalyst 230, one SCR catalyst 230 downstream followed by one ASC 240, at least two selective Catalytic Reduction ($SCR_1$, $SCR_2$) catalysts 231, 232, and/or at least two selective Catalytic Reduction ($SCR_1$, $SCR_2$) catalysts 231, 232 each one possibly being followed downstream by an Ammonia Slip Catalyst $ASC_1$, $ASC_2$ 241, 242.

The at least one control unit 280 is in FIGS. 2a and 2b illustrated as including separately illustrated units 281, 282, 283. These units 281, 282, 283 can, however, be logically separated but physically implemented in the same unit, or can be both logically and physically arranged together. These units 281, 282, 283 can for example correspond to groups of instructions, which can be in the form of programming code, that are input into, and are utilized by a processor/computing unit 401 when the units are active and/or are utilized for performing its method step, respectively.

A person skilled in the art will also realise that the above system may be modified according to the different embodiments of the method according to the invention. In addition, the invention relates to a motor vehicle 100, for example a truck or a bus, comprising at least one system for treatment of an exhaust stream.

The present invention is not limited to the embodiments of the invention described above, but pertains to and comprises all embodiments within the scope of the enclosed independent claims.

The invention claimed is:

1. A method for controlling at least one sectional ammonia coverage degree profile $NH_{3\_profile}$ for at least one selective Catalytic Reduction (SCR) catalyst included in an exhaust gas treatment system arranged for treating an exhaust stream being output from a combustion engine; the method comprising:

determining at least one sectional ammonia coverage degree profile $NH_{3\_profile\_det}$ for said at least one SCR catalyst including at least two sectional ammonia coverage degrees $NH_{3\_det\_1}, NH_{3\_det\_2}, \ldots, NH_{3\_det\_n}$ for at least two sections of said at least one SCR catalyst, based on a flow F, a temperature T and a composition C of said exhaust stream upstream of said at least one SCR catalyst, said at least one sectional ammonia coverage degree profile $NH_{3\_profile\_det}$ indicating ammonia stored along said at least one SCR catalyst;

comparing said at least one sectional ammonia coverage degree profile $NH_{3\_profile\_det}$ with at least one sectional reference profile for an ammonia coverage degree $NH_{3\_profile\_ref}$ for said at least one SCR catalyst, said at least one sectional reference profile for an ammonia coverage degree $NH_{3\_profile\_ref}$ being related to an available capacity for reduction of nitrogen oxides $NO_x$ for said at least one selective Catalytic Reduction (SCR) catalyst, and including at least two sectional ammonia coverage reference degrees $NH_{3\_ref\_1}$, $NH_{3\_ref\_2}, \ldots, NH_{3\_ref\_n}$, for said at least two sections of said at least one SCR catalyst, wherein each said at least one reference profile is determined by solving mass balances over said at least one SCR catalyst for an equilibrium ammonia coverage profile that corresponds to a desired concentration of an exhaust component downstream of said at least one SCR catalyst, said comparing including comparing said at least two sectional ammonia coverage degrees $NH_{3\_det\_1}$, $NH_{3\_det\_2}, \ldots, NH_{3\_det\_n}$ with said at least two sectional ammonia coverage reference degrees $NH_{3\_ref\_1}, NH_{3\_ref\_2}, \ldots, NH_{3\_ref\_n}$; and controlling, based on said comparing, at least one of a concentration of nitrogen oxides $C_{NOx}$ in said exhaust stream to be output from said combustion engine and a dosage of a reductant including ammonia $NH_3$ to be injected into said exhaust stream upstream of said at least one SCR catalyst wherein, if said comparing indicates that there is a difference $Diff_{profiles}$ between said at least one ammonia coverage degree profile $NH_{3\_profile\_det}$ and said at least one reference profile for said ammonia coverage degree $NH_{3\_profile\_ref}$, said controlling includes controlling at least one of said concentration of nitrogen oxides $C_{NOx}$ and said dosage of said reductant such that said difference $Diff_{profiles}$ is reduced and wherein said difference $Diff_{profiles}$ is calculated as a weighted summation of at least two sectional differences $Diff_1, Diff_2, \ldots, Diff_n$ between said at least two sectional ammonia coverage degrees $NH_{3\_det\_1}, NH_{3\_det\_2}, \ldots, NH_{3\_det\_n}$ and said at least two sectional ammonia coverage reference degrees $NH_{3\_ref\_1}, NH_{3\_ref\_2}, \ldots, NH_{3\_ref\_n}$ for said at least one SCR catalyst, wherein each one of said at least two sectional differences $Diff_1, Diff_2, Diff_n$ is weighted by a sectional weighting coefficient $W_1, W_2, \ldots, W_n$, and wherein said weight coefficients are determined to convert each sectional difference to a required addition or subtraction of a concentration of ammonia in said section in order to yield a required reductant dosing, said weight coefficients being determined to convert each sectional difference to a required addition or subtraction of the concentration of $NO_x$ in said section in order to yield a required $NO_x$ concentration to output from said combustion engine.

2. The method as claimed in claim 1, wherein said controlling includes at least one step from a group that includes:
  adjusting said dosage of said reductant, in relation to a reference dosage needed for providing a reduction of said at least two sectional differences $Diff_1, Diff_2, Diff_n$, with an amount of reductant being related to said weighted summation of said at least two sectional differences $Diff_1, Diff_2, \ldots, Diff_n$; and
  adjusting said concentration of nitrogen oxides $C_{NOx}$ in said exhaust stream to be output from said combustion engine, in relation to a reference concentration needed for providing a reduction of said at least two sectional differences $Diff_1, Diff_2, Diff_n$, with a concentration adjustment being related to said weighted summation of said at least two sectional differences $Diff_n, Diff_2, \ldots, Diff_n$.

3. The method as claimed in claim 2, wherein said controlling includes at least one step from a group that includes:
  multiplying said amount of reductant and/or said concentration adjustment with an overall control gain; and
  multiplying one or more of the at least two sectional weighting coefficients $W_1, W_2, \ldots, W_n$ used for calculating said weighted summation with a sectional control gain.

4. The method as claimed in claim 1, wherein the at least two sectional weighting coefficients $W_1, W_2, \ldots, W_n$ used for calculating said weighted summation are determined based on at least one sectional net change selected from a group that includes:
  a sectional net change of an ammonia $NH_3$ storage rate in relation to a sectional coverage degree and said flow F of said exhaust; and
  a sectional net change of an ammonia $NH_3$ storage rate in relation to a sectional coverage degree and a converted exhaust flow of nitrogen oxides $NO_x$.

5. The method as claimed in claim 1, wherein said controlling includes:
  determining a capacity $CAP_{SCR\_NOx}$ for said at least one SCR catalyst to reduce nitrogen oxides NO based on said sectional ammonia coverage degree profile $NH_{3\_profile\_det}$;
  comparing said capacity $CAP_{SCR\_NOx}$ with a concentration of nitrogen oxides $C_{NOx}$ in said exhaust stream being output from said combustion engine; and
  determining, based on said comparing, if said concentration of nitrogen oxides $C_{NOx}$ output from said combustion engine and/or said dosage of said reductant should be adapted by said controlling.

6. The method as claimed in claim 1, wherein said controlling of said concentration of nitrogen oxides $C_{NOx}$ being output from said combustion engine includes at least one step from a group that includes:
  selecting of at least one injection strategy for said combustion engine;
  controlling of a timing for an injection of fuel into at least one cylinder of said combustion engine;
  controlling of injection pressure for an injection of fuel into at least one cylinder of said combustion engine;
  controlling of an injection phasing for an injection of fuel into at least one cylinder of said combustion engine;
  controlling of a device for exhaust recirculation (EGR); and
  controlling of a contribution of said combustion engine to a total momentum being provided by a hybrid drivetrain comprising both said combustion engine and an electrical motor.

7. The method as claimed in claim 1, wherein an increase of said concentration of nitrogen oxides $C_{NOx}$ to be output from said combustion engine is achieved by at least one step from a group that includes:
  advancing a timing of an injection of fuel into at least one cylinder of said combustion engine;
  increasing an injection pressure of an injection of fuel into at least one cylinder of said combustion engine;
  controlling an injection phasing to provide a relatively large pressure gradient for an injection of fuel into at least one cylinder of said combustion engine; and
  reducing a fraction of said exhaust stream which is recirculated through a device for exhaust recirculation (EGR); and/or
  wherein a decrease of said concentration of nitrogen oxides $C_{NOx}$ to be output from said combustion engine is achieved by at least one step from a group that includes:
  delaying a timing of an injection of fuel into at least one cylinder of said combustion engine;
  reducing an injection pressure of an injection of fuel into at least one cylinder of said combustion engine;
  controlling an injection phasing to provide a relatively small pressure gradient for an injection of fuel into at least one cylinder of said combustion engine; and
  increasing a fraction of said exhaust stream which is recirculated through a device for exhaust recirculation (EGR).

8. The method as claimed in claim 1, wherein said determining of said at least one sectional ammonia coverage degree profile $NH_{3\_profile\_det}$ for said at least one SCR catalyst is also based on at least one of the following:
  a measurement performed by usage of at least one nitrogen oxides $NO_x$ sensor located downstream of said at least one SCR catalyst;

a measurement performed by usage of at least one nitrogen oxides $NO_x$ sensor located downstream of at least one Ammonia Slip Catalyst (ASC) being arranged downstream of said at least one SCR catalyst;

a measurement performed by usage of at least one ammonia $NH_3$ sensor located downstream of said at least one SCR catalyst;

a measurement performed by usage of at least one ammonia $NH_3$ sensor located downstream of at least one Ammonia Slip Catalyst (ASC) being arranged downstream of said at least one SCR catalyst;

a combination of measurements performed by usage of at least one nitrogen oxides $NO_x$ sensor located downstream of said at least one SCR catalyst and/or downstream of at least one Ammonia Slip Catalyst (ASC) being arranged downstream of said at least one SCR catalyst and/or by usage of at least one ammonia $NH_3$ sensor located downstream of said at least one SCR catalyst and/or downstream of at least one Ammonia Slip Catalyst (ASC) being arranged downstream of said at least one SCR catalyst;

an estimation of a concentration of nitrogen oxides $NO_x$ in said exhaust stream downstream of said at least one SCR catalyst;

an estimation of a concentration of nitrogen oxides $NO_x$ in said exhaust stream downstream of at least one Ammonia Slip Catalyst (ASC) being arranged downstream of said at least one SCR catalyst;

an estimation of a concentration of ammonia $NH_3$ in said exhaust stream downstream of said at least one SCR catalyst;

an estimation of a concentration of ammonia $NH_3$ in said exhaust stream downstream of at least one Ammonia Slip Catalyst (ASC) being arranged downstream of said at least one SCR catalyst;

a measurement performed by usage of at least one nitrogen oxides $NO_x$ sensor located upstream of said at least one SCR catalyst; and an estimation of a concentration of nitrogen oxides $NO_x$ in said exhaust stream upstream of said at least one SCR catalyst.

9. A computer program product, comprising computer code stored on a computer-readable medium, which computer code, when extended in a computer, causes the computer to execute the method according to claim 1.

10. A system arranged for controlling at least one sectional ammonia coverage degree profile $NH_{3\_profile}$ for at least one selective Catalytic Reduction (SCR) catalyst included in an exhaust gas treatment system arranged for treating an exhaust stream output from a combustion engine; the system comprising:

a determination unit, arranged for determining at least one sectional ammonia coverage degree profile $NH_{3\_profile\_det}$ for said at least one SCR catalyst including at least two sectional ammonia coverage degrees $NH_{3\_det\_1}$, $NH_{3\_det\_2}$, ..., $NH_{3\_det\_n}$ for at least two sections of said at least one SCR catalyst, based on a flow F, a temperature T and a composition C of said exhaust stream upstream of said at least one SCR catalyst, said at least one sectional ammonia coverage degree profile $NH_{3\_profile\_det}$ indicating ammonia stored along said at least one SCR catalyst;

a comparison unit, arranged for comparing said at least one sectional ammonia coverage degree profile $NH_{3\_profile\_det}$ with at least one sectional reference profile for an ammonia coverage degree $NH_{3\_profile\_ref}$ for said at least one SCR catalyst, said at least one sectional reference profile for an ammonia coverage degree $NH_{3\_profile\_ref}$ being related to an available capacity for reduction of nitrogen oxides $NO_x$ for said at least one selective Catalytic Reduction (SCR) catalyst, and including at least two sectional ammonia coverage reference degrees $NH_{3\_ref\_1}$, $NH_{3\_ref\_2}$, ..., $NH_{3\_ref\_n}$, for said at least two sections of said at least one SCR catalyst, wherein said reference profile is determined by solving mass balances over said at least one SCR catalyst for an equilibrium ammonia coverage profile that corresponds to a desired concentration of an exhaust component downstream of said at least one SCR catalyst, said comparing including comparing said at least two sectional ammonia coverage degrees $NH_{3\_det\_1}$, $NH_{3\_det\_2}$, ..., $NH_{3\_det\_n}$ with said at least two sectional ammonia coverage reference degrees $NH_{3\_ref\_1}$, $NH_{3\_ref\_2}$, ..., $NH_{3\_ref\_n}$; and a control unit, arranged for controlling, based on said comparing, at least one of a concentration of nitrogen oxides $C_{NOx}$ in said exhaust stream to be output from said combustion engine and a dosage of a reductant including ammonia $NH_3$ to be injected into said exhaust stream upstream of said at least one SCR catalyst, wherein if said comparing indicates that there is a difference $Diff_{profiles}$ between said at least one ammonia coverage degree profile $NH_{3\_profile\_det}$ and said at least one reference profile for said ammonia coverage degree $NH_{3\_profile\_ref}$, said controlling includes controlling at least one of said concentration of nitrogen oxides $C_{NOx}$ and said dosage of said reductant such that said difference $Diff_{profiles}$ is reduced and wherein said difference $Diff_{profiles}$ is calculated as a weighted summation of at least two sectional differences $Diff_1$, $Diff_2$, ..., $Diff_n$ between said at least two sectional ammonia coverage degrees $NH_{3\_det\_1}$, $NH_{3\_det\_2}$, ..., $NH_{3\_det\_n}$ and said at least two sectional ammonia coverage reference degrees $NH_{3\_ref\_1}$, $NH_{3\_ref\_2}$, ..., $NH_{3\_ref\_n}$, for said at least one SCR catalyst, wherein each one of said at least two sectional differences $Diff_1$, $Diff_2$, ..., $Diff_n$ is weighted by a sectional weighting coefficient $W_1$, $W_2$, ..., $W_n$, and wherein said weight coefficients are determined to convert each sectional difference to a required addition or subtraction of a concentration of ammonia in said section in order to yield a required reductant dosing, said weight coefficients being determined to convert each sectional difference to a required addition or subtraction of the concentration of $NO_x$ in said section in order to yield a required $NO_x$ concentration to output from said combustion engine.

11. A vehicle including:
an engine;
an exhaust gas treatment system; and
the system according to claim 10.

12. The vehicle as claimed in claim 11, wherein said exhaust gas treatment system includes at least one from the following:
one SCR catalyst;
one SCR catalyst downstream followed by one Ammonia Slip Catalyst (ASC);
at least two selective Catalytic Reduction ($SCR_1$, $SCR_2$) catalysts; and
at least two selective Catalytic Reduction ($SCR_1$, $SCR_2$) catalysts, each one of said at least two selective Catalytic Reduction catalysts being followed downstream by an Ammonia Slip Catalyst ($ASC_1$, $ASC_2$).

* * * * *